US012587339B2

(12) United States Patent
Afshang et al.

(10) Patent No.: US 12,587,339 B2
(45) Date of Patent: Mar. 24, 2026

(54) COEXISTENCE OF PTRS WITH NR REFERENCE SIGNALS

(71) Applicant: Telefonaktiebolaget LM Ericsson (publ), Stockholm (SE)

(72) Inventors: Mehrnaz Afshang, Fremont, CA (US); Dennis Hui, Sunnyvale, CA (US); Jung-Fu Cheng, Fremont, CA (US); Stephen Grant, Pleasanton, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 410 days.

(21) Appl. No.: 18/020,046

(22) PCT Filed: Aug. 9, 2021

(86) PCT No.: PCT/IB2021/057340
§ 371 (c)(1),
(2) Date: Feb. 6, 2023

(87) PCT Pub. No.: WO2022/029745
PCT Pub. Date: Feb. 10, 2022

(65) Prior Publication Data
US 2023/0327832 A1     Oct. 12, 2023

Related U.S. Application Data

(60) Provisional application No. 63/062,977, filed on Aug. 7, 2020.

(51) Int. Cl.
H04L 5/00 (2006.01)
H04L 25/03 (2006.01)

(52) U.S. Cl.
CPC ...... H04L 5/0051 (2013.01); H04L 25/03821 (2013.01)

(58) Field of Classification Search
None
See application file for complete search history.

(56) References Cited

U.S. PATENT DOCUMENTS

2019/0044673 A1*   2/2019   Maleki .................. H04L 5/0051
2019/0327042 A1*   10/2019   Maleki .................. H04L 27/266
(Continued)

OTHER PUBLICATIONS

Gu et al., "Phase Noise Estimation and Compensation Algorithms for 5G Systems", Institute for Computer Sciences, Social Informatics and Telecommunications Engineering, pp. 551-561, 2019.
(Continued)

*Primary Examiner* — Duc T Duong

(57)     ABSTRACT

According to some embodiments, a method performed by a wireless device comprises receiving a wireless signal $R_k$ over all subcarriers allocated to the wireless device. The signal $R_k$ comprises a phase tracking reference signal (PT-RS) on a subset of subcarriers allocated to the wireless device. The method further comprises computing a de-inter-carrier interference (ICI) filter based on a cross correlation of the PT-RS and one or more additional subcarriers and applying the de-ICI filter to the received signal $R_k$ to generate a de-ICI filtered signal.

20 Claims, 23 Drawing Sheets

1700

1712 – receive a wireless signal $R_k$ over all subcarriers allocated to the wireless device, the signal $R_k$ comprising a PT-RS on a subset of subcarriers allocated to the wireless device 1714 – compute a de-ICI filter based on a cross correlation of the PT-RS and one or more additional subcarriers 1716 – apply the de-ICI filter to the received signal $R_k$ to generate a de-ICI filtered signal

(56) References Cited

U.S. PATENT DOCUMENTS

| | | | |
|---|---|---|---|
| 2019/0327043 A1 | 10/2019 | Maleki et al. | |
| 2019/0356515 A1* | 11/2019 | Murakami | H04L 27/2657 |
| 2020/0220755 A1* | 7/2020 | Maki | H04L 27/2675 |
| 2020/0252184 A1 | 8/2020 | Kundargi et al. | |
| 2020/0295893 A1* | 9/2020 | Maki | H04L 27/261 |
| 2021/0045071 A1* | 2/2021 | Maki | H04L 1/0003 |
| 2021/0273759 A1* | 9/2021 | Maki | H04L 1/0003 |
| 2022/0060361 A1* | 2/2022 | Zhang | H04L 5/0007 |

OTHER PUBLICATIONS

Petrovic et al., "Effects of Phase Noise on OFDM Systems With and Without PLL: Characterization and Compensation," IEEE Trans. Comm., Aug. 2007.

Syrjälä et al. "Pilot Allocation and Computationally Efficient Non-Iterative Estimation of Phase Noise in OFDM," IEEE Wireless Comm Letters, Apr. 2019.

Tervo et al. "5G New Radio Evolution Towards Sub-THz Communications," Department of Electrical Engineering, Tampere University, Finland, Feb. 7, 2020.

* cited by examiner

| Frequency range designation | Corresponding frequency range |
|---|---|
| FR1 | 410 MHz – 7125 MHz |
| FR2 | 24250 MHz – 52600 MHz |

Fig. 1

| $\mu$ | $\Delta f = 2^{\mu} \cdot 15 \ [kHz]$ | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Fig. 3

1 symbol resource
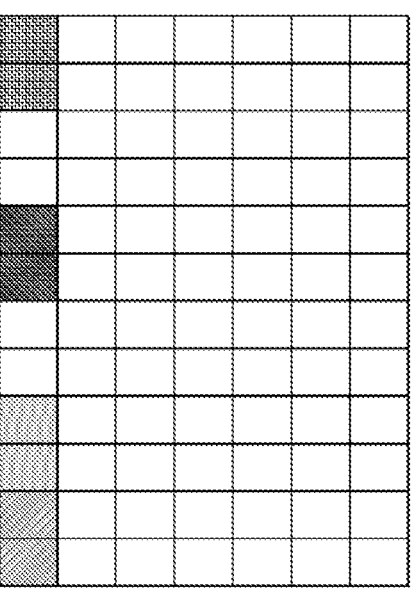
2 symbol resource
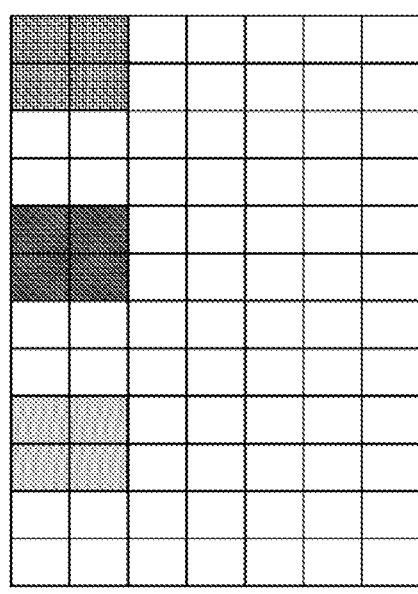
4 symbol resource (adjacent)
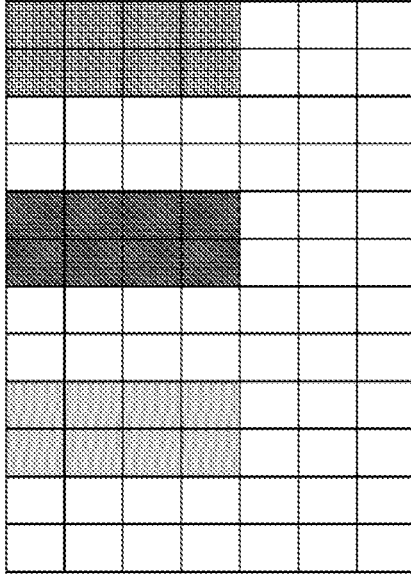
4 symbol resource (pairwise adjacent)
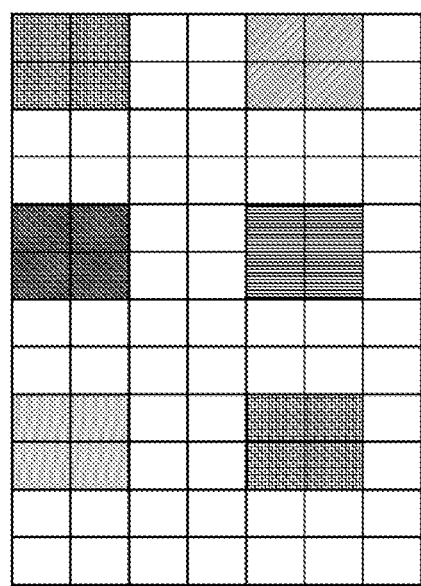
Fig. 5

Fig. 11

TRS

DM-RS

PT-RS

Time

Frequency

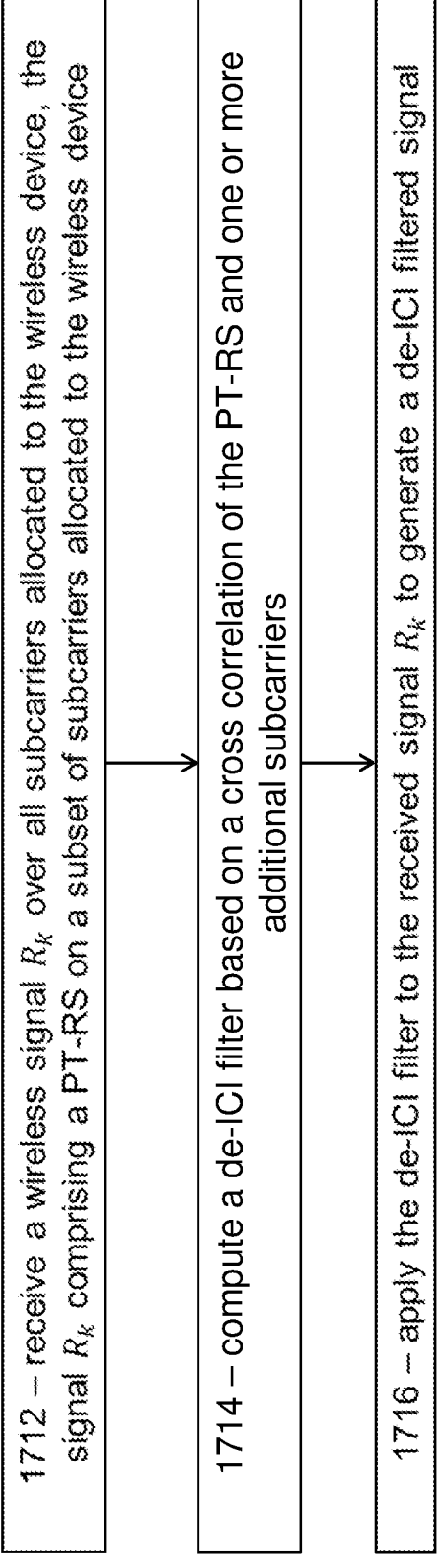

1700

1712 – receive a wireless signal $R_k$ over all subcarriers allocated to the wireless device, the signal $R_k$ comprising a PT-RS on a subset of subcarriers allocated to the wireless device 1714 – compute a de-ICI filter based on a cross correlation of the PT-RS and one or more additional subcarriers 1716 – apply the de-ICI filter to the received signal $R_k$ to generate a de-ICI filtered signal

Fig. 17

| | | |
|---|---|---|
| 710 Host computer provides user data | 720 Host computer initiates transmission carrying the user data to the UE | 730 UE receives the user data |

| | | | |
|---|---|---|---|
| 610 Host computer provides user data | 620 Host computer initiates transmission carrying the user data to the UE | 630 Base station transmits the user data | 640 UE executes client application |

611 Host computer executes client application

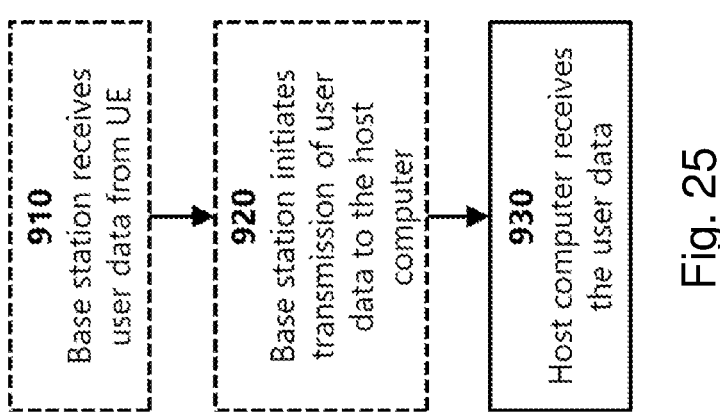

910
Base station receives user data from UE

920
Base station initiates transmission of user data to the host computer

930
Host computer receives the user data

Fig. 25

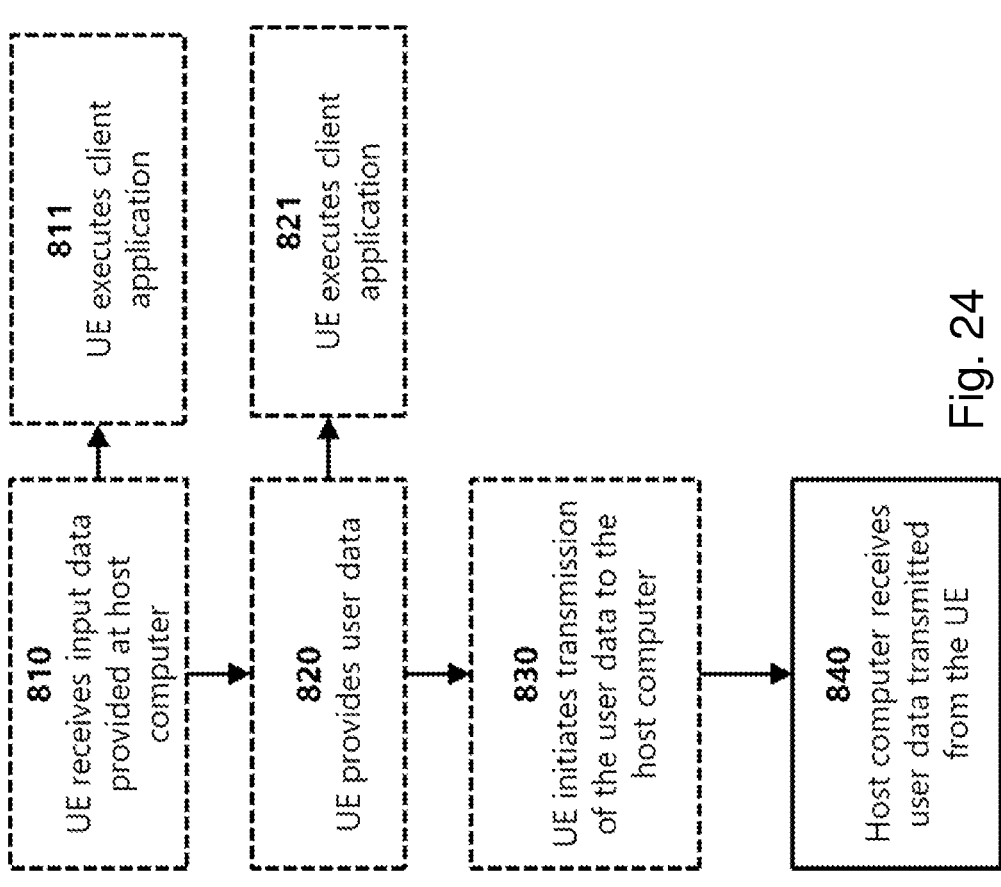

811
UE executes client application

821
UE executes client application

810
UE receives input data provided at host computer

820
UE provides user data

830
UE initiates transmission of the user data to the host computer

840
Host computer receives user data transmitted from the UE

Fig. 24

COEXISTENCE OF PTRS WITH NR REFERENCE SIGNALS

RELATED APPLICATIONS

This application is a national phase application of International Patent Application No. PCT/IB2021/057340, filed Aug. 9, 2021, which claims priority to U.S. Provisional Application No. 63/062,977, entitled "COEXISTENCE OF PTRS WITH NR REFERENCE SIGNALS," filed Aug. 7, 2020, the disclosures of which are hereby incorporated herein by reference in their entirety.

TECHNICAL FIELD

Particular embodiments relate to wireless communication, and more specifically to coexistence of phase tracking reference signals (PT-RS) with new radio (NR) reference signals.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Mobile broadband will continue to drive the demands for big overall traffic capacity and huge achievable end-user data rates in the wireless access network. Several scenarios may require data rates of up to 10 Gbps in local areas. These demands for very high system capacity and very high end-user date rates can be met by networks with distances between access nodes ranging from a few meters in indoor deployments up to roughly 50 m in outdoor deployments, i.e., with an infra-structure density considerably higher than the densest networks of today.

Third Generation Partnership Project (3GPP) Rel-15 specifies a fifth generation (5G) system referred as new radio (NR). NR standard in 3GPP is designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Besides traditional licensed exclusive bands, NR systems are being extended to operate in unlicensed bands. The NR system specifications currently address two frequency ranges (FR1 and FR2), which are summarized in FIG. 1. To support ever growing mobile traffic, further extension of the NR system to support spectrum higher than 5.26 GHz is expected in the near future.

The downlink transmission waveform in NR is conventional orthogonal frequency division multiplexing (OFDM) using a cyclic prefix. The uplink transmission waveform is conventional OFDM using a cyclic prefix with a transform precoding function performing discrete Fourier transform (DFT) spreading that can be disabled or enabled. The basic transmitter block diagram for NR is illustrated in FIG. 2.

FIG. 2 is a block diagram illustrating the NR transmitter block diagram for CP-OFDM with optional DFT-spreading. The transmitter block includes the transform precoding block, sub-carrier mapping block, inverse fast Fourier transform. (IFFT) block, and the cyclic prefix (CP) insertion block.

Multiple numerologies are supported in NR. A numerology is defined by sub-carrier spacing and cyclic prefix overhead. Multiple subcarrier spacings (SCS) can be derived by scaling a basic subcarrier spacing by an integer $2^\mu$. The numerology used can be selected independently of the frequency band although it is assumed not to use a very small subcarrier spacing at very high carrier frequencies. Flexible network and user equipment (UE) channel bandwidths are supported. The supported transmission numerologies in NR are summarized in FIG. 3.

The maximum channel bandwidth per NR carrier is 400 MHz in Rel-15. At least for single numerology case, candidates of the maximum number of subcarriers per NR carrier is 3300 in Rel-15.

Downlink and uplink transmissions are organized into frames with 10 ms duration, consisting of ten 1 ms subframes. Each frame is divided into two equally-sized halfframes of five subframes each. The slot duration is 14 symbols with Normal CP and 12 symbols with Extended CP, and scales in time as a function of the used sub-carrier spacing so that there is always an integer number of slots in a subframe. More specifically, the number of slots per subframe is $2^\mu$.

The basic NR downlink physical resource within a slot can thus be seen as a time-frequency grid as illustrated in FIG. 4 for 15 kHz sub-carrier spacing numerology, where each resource element corresponds to one OFDM subcarrier during one OFDM symbol interval. A resource block is defined as 12 consecutive subcarriers in the frequency domain. The uplink subframe has the same subcarrier spacing as the downlink and the same number of SC-FDMA symbols in the time domain as OFDM symbols in the downlink.

Channel state information reference signals (CSI-RS) are downlink reference signals intended to be used by devices to acquire downlink channel-state information (CSI). Specific instances of CSI reference signals can be configured for time/frequency tracking and mobility measurements. Examples of the various of CSI-RS patterns are illustrated in FIG. 5.

FIG. 5 comprises time and frequency diagrams illustrating CSI-RS patterns. The horizontal axis represents frequency and the vertical axis represents time. The illustrated examples include 1 symbol CSI-RS resource pattern, 2 symbol CSI-RS resource pattern, 4 symbol adjacent CSI-RS resource pattern, and 4 symbol pairwise adjacent CSI-RS resource pattern.

A tracking reference signal (TRS) is needed for fine time and frequency synchronizations which are required for channel estimation and demodulation. A TRS is referred to as "CSI-RS for tracking" in 3GPP specifications. TRS is also used for Doppler and delay spread estimations required for setting filters for chancel estimation. Examples of the various TRS patterns are show in FIG. 6.

FIG. 6 is a time and frequency diagram illustrating TRS mapping in NR. The horizontal axis represents frequency and the vertical axis represents time. FIG. 6 illustrates the fixed and configurable symbol positions and the fixed and configurable subcarriers.

For extending NR operation above 52.6 GHz, several challenges such as designing a low complexity algorithm for phase noise (PN) compensation, designing phase tracking reference signal (PT-RS) for low complexity phase noise compensation algorithm, and coexistence of PT-RS with existing NR reference signal such as TRS (called "CSI-RS for tracking" in 3GPP specifications), CSI-RS, and SRS need to be addressed.

Oscillators are important elements of transmitters and receivers in wireless systems. The main function of oscillators is to up-convert a base-band signal to a radio-frequency signal at the transmitter and down-convert a radio-frequency signal to a base-band signal at the receiver. Ideally, an oscillator generates a perfect sinusoidal signal with frequency $f_0$. In practical situations, the signal generated by oscillators is not perfect and has low random fluctuations in the phase, which are usually called phase noise. An oscillator with a central frequency $f_0$ and the effects of phase noise can be modelled as $$V(t) = \exp(j(2\Pi t f_0 + \phi(t)))$$

in which $\phi(t)$ is a stochastic process that modifies the phase of the ideal sinusoidal signal, called phase noise. The level of the generated phase noise is dependent to the carrier frequency. That is, the higher the carrier frequency, the higher the level of phase noise. For every doubling of the carrier frequency, the level of phase noise approximately increases by 6 dB. In OFDM signals, the impact of phase noise is observed as common phase error (CPE), which introduces a multiplicative phase distortion that is common across all sub-carriers, and as inter-carrier interference (ICI), which results from the loss of orthogonality between sub-carriers. The impact of phase noise on system performance can be sufficiently mitigated by applying CPE correction algorithms in FR1 and FR2, however, for extending NR operation above 52.6 GHz, ICI begins to dominate and therefore will need to apply appropriate ICI suppression algorithms.

Let the transmitted symbol and the channel response for sub-carrier k be $S_k$ and $H_k$, respectively. The time-varying phase noise induces inter-carrier-interference in the received signal $R_k$[1]:

$$R_k = \sum_i J_i H_{k-i} S_{k-i} + W_k.$$

The taps of the true ICI filter $\{J_i\}$ are unknown to the receiver and must be estimated.

The existing NR Rel-16 phase tracking reference signal is a UE-specific reference signal intended for phase rotation estimation and compensation. PT-RS is designed with various time and frequency density and is mapped across the bandwidth part (BWP) allocated to a UE. Because CPE from phase noise is common across all the sub-carriers in an OFDM symbol while varying across time from symbol to symbol, typically, PT-RS have lower density in frequency as illustrated in FIG. 7 but have higher density in time.

FIG. 7 is a time and frequency diagram illustrating NR PT-RS distributed in frequency domain. The horizontal axis represents time and the vertical axis represents frequency.

Examples of the various PT-RS patterns together with different TYPE-1 demodulation reference signals (DM-RS) patterns are illustrated in FIG. 8.

The time densest PT-RS pattern is one where all OFDM symbols are mapped with PT-RS while the time sparsest PT-RS mapping is when PT-RS is mapped on every 4th OFDM symbol. Similarly, the densest PT-RS frequency mapping is every 2nd PRB while the sparsest is every 4th PRB. The faster the phase noise changes across OFDM symbols, the denser PT-RS time mapping is needed. At very high frequencies, e.g., in the 52.6-71 GHz band, the phase noise is expected to vary significantly from one OFDM symbol to the next. In fact, the time continuity of phase noise effects across OFDM symbols cannot be guaranteed, precluding the use of interpolation between OFDM symbols based on the time-sparse PTRS patterns. High time-density is needed in this case, e.g., every OFDM symbol.

PT-RS is configurable depending on the quality of the oscillators, carrier frequency, OFDM subcarrier spacing, and modulation and coding schemes used for transmission.

PT-RS are transmitted on sub-carriers $k_0$, $k_1$, $k_{N-1}$. The values of $S_k$ at these sub-carriers are thus known and can be used to estimate a common phase error $b_0$ such that $$R_k \approx b_0 H_k S_k \text{ for } k \in \{k_0, k_1, \ldots, k_{N-1}\}.$$

The common phase error can be estimated by finding $b_0$ that minimizes the following sum of squares:

$$\hat{b}_0 = \underset{b_0}{\operatorname{argmin}} \sum_{k \in \{k_0, k_1, \ldots, k_{N-1}\}} |R_k - b_0 H_k S_k|^2$$

The optimization problem can be expressed in a vector form to help derive the solution. Define $$r_0 \triangleq \begin{bmatrix} R_{k_0} \\ \vdots \\ R_{k_{N-1}} \end{bmatrix} \text{ and } x \triangleq \begin{bmatrix} H_{k_0} S_{k_0} \\ \vdots \\ H_{k_{N-1}} S_{k_{N-1}} \end{bmatrix}.$$

Then, the least square problem can be solved as follows:

$$\hat{b}_0 \triangleq \underset{b_0}{\operatorname{argmin}} \|r_0 - b_0 x\|^2 = (x^H x)^{-1} x^H r_0 = \frac{\sum_k H_k^* S_k^* R_k}{\sum_k |H_k S_k|^2},$$

where $x^H$ denotes the conjugate transpose (also known as Hermitian) of vector x. The common phase error in the received signal $R_k$ can then be compensated by multiplying the conjugate of the estimated common phase error to de-rotate the phase error:

$$R'_k \triangleq \hat{b}^*_0 R_k.$$

The compensated signal $R'_k$ can then be fed to the OFDM demodulator.

There is also an alternative clustered structure for phase tracking reference signal (PT-RS). To estimate the ICI filter $\{J_i\}$ beyond just the common phase error, two approaches have been investigated in the literature. The first approach relies on decision feedback of the data sub-carriers to assist the ICI filter estimation. This approach requires high computational complexity and is unlikely to be suitable for high data rate use cases for NR operation in 52.6 to 71 GHz. The second approach assumes the availability of known symbols in a block of contiguous sub-carriers. This requires modification of the Rel-15 PTRS structure.

In this proposal, the PTRS are clustered in the frequency domain to create a block of contiguous known symbols as illustrated in FIG. 9.

Let $\{k_0, k_0+1, \ldots, k_0+M-1\}$ denote the sub-carrier indices of the block of M consecutive known symbols. The object is to estimate a (2u+1)-tap filter such that $$\sum_{m=-u}^{u} b_m H_{k-m} S_{k-m} \approx R_k \text{ for } k \in \{k_0 + u, k_0 + u + 1, \ldots, k_0 + M - u - 1\}.$$

There are only M−2u equations in the above because $S_k$ is not known if $k<k_0$ or $k>k_0+M-1$. To proceed, define the matrix and vector notation:

$$X_u \triangleq \begin{bmatrix} H_{k_0+2u}S_{k_0+2u} & H_{k_0+2u-1}S_{k_0+2u-1} & \cdots & H_{k_0}S_{k_0} \\ H_{k_0+2u+1}S_{k_0+2u+1} & H_{k_0+2u}S_{k_0+2u} & \cdots & H_{k_0+1}S_{k_0+1} \\ \vdots & \vdots & \ddots & \vdots \\ H_{k_0+M-1}S_{k_0+M-1} & H_{k_0+M-1}S_{k_0+M-2} & \cdots & H_{k_0+M-2u-1}S_{k_0+M-2u-1} \end{bmatrix},$$

$$b \triangleq \begin{bmatrix} b_{-u} \\ b_{-u+1} \\ \vdots \\ b_u \end{bmatrix},$$

$$\text{and } r_u \triangleq \begin{bmatrix} R_{k_0+u} \\ R_{k_0+u+1} \\ \vdots \\ R_{k_0+M-u-1} \end{bmatrix}$$

The finite tap approximation of the ICI filter can be obtained from minimizing the following residue sum of squares:

$$b_u \triangleq \underset{b_u}{\operatorname{argmin}} \|X_u b_u - r_u\|^2 = \left(X_u^H X_u\right)^{-1} X_u^H r_u.$$

To avoid the least square problem becoming under-determined, it is necessary that M−2u≥2u+1. That is, to estimate a (2u+1)-tap approximation of the ICI filter, the block size of contiguous known symbols should satisfy M≥4u+1.

To compensate the ICI, the received signal $\{R_k\}$ is filtered by $\{\hat{b}^*_u, \hat{b}^*_{u-1}, \ldots, \hat{b}^*_{-u}\}$:

$$R'_k \triangleq \sum_{m=-u}^{u} \hat{b}^*_m R_{k+m}.$$

The filtered signal $R'_k$ can then be fed to the OFDM demodulator. For the ICI compensation algorithm to work well, it is implicitly assumed that the convolution of the true ICI filter $\{J_k\}$ and the conjugate reverse of the estimated ICI filter $\{\hat{b}^*_u, \hat{b}^*_{u-1}, \ldots, \hat{b}^*_{-u}\}$ is approximately a unit impulse signal. In practice, however, there is no guarantee that the least square solution satisfies this criterion.

There currently exist certain challenges. For example, the existing NR PT-RS structure is mainly designed for CPE compensation. For extending NR operation to above 52.6 GHz, full phase noise compensation (i.e., CPE and ICI compensation) is required.

When a clustered PT-RS structure is applied to the NR system, the new PT-RS locations may collide with other existing NR reference signals. This can cause one of the reference signals to be discarded at the transmitter. Furthermore, the approach of estimating the ICI filter first and then use modification of the estimate to compensate the ICI degradation may not achieve the desired effect. As described above, practical ways of estimating the ICI filter do not necessarily satisfy the correct compensation property.

SUMMARY

As described above, certain challenges currently exist with compensating for inter-carrier interference (ICI) at high frequencies. Certain aspects of the present disclosure and their embodiments may provide solutions to these or other challenges. For example, particular embodiments include a low-complexity method for estimating a de-ICI filter that can be applied directly to the received signal in frequency domain to remove the effect of ICI caused by phase noise or by other impairments, such as those related to frequency misalignment (e.g., frequency offset or Doppler). Particular embodiments enable a direct estimation of the de-ICI filter using phase tracking reference signal (PT-RS) symbols that are positioned in any pre-determined subcarriers, not necessarily consecutive subcarriers. Particular embodiments enable the set of PT-RS symbol locations to be chosen arbitrarily and to vary from one orthogonal frequency division multiplexing (OFDM) symbol to another.

In general, particular embodiments include reference pilot signals designed for efficient full phase noise estimation and compensation.

According to some embodiments, a method performed by a wireless device comprises receiving a wireless signal $R_k$ over all subcarriers allocated to the wireless device. The signal $R_k$ comprises a phase tracking reference signal (PT-RS) on a subset of subcarriers allocated to the wireless device. The method further comprises computing a de-inter-carrier interference (ICI) filter based on a cross correlation of the PT-RS and one or more additional subcarriers and applying the de-ICI filter to the received signal $R_k$ to generate a de-ICI filtered signal.

In particular embodiments, the one or more additional subcarriers are adjacent to the PT-RS.

In particular embodiments, the PT-RS and the one or more additional subcarriers are not all contiguous subcarriers (i.e., the subset of PT-RS subcarriers may not all be contiguous and/or the one or more additional subcarriers may not all be contiguous with each other or with the PT-RS.

In particular embodiments, the one or more additional subcarriers comprise a reference signal other than a PT-RS, such as a new radio (NR) reference signal (e.g., TRS, CSI-RS, etc.).

In particular embodiments, the PT-RS comprises a subset of symbols of its subcarrier. The remaining symbols of the subcarrier not in the PT-RS subset may comprise a reference signal (e.g., TRS, CSI-RS, etc.).

In particular embodiments, the wireless device comprises more than one receive antennas. A first subset of the more than one receive antennas may be associated with a first local oscillator, a second subset of the more than one receive antennas may be associated with a second local oscillator, and a first de-ICI filter may be used for the first subset of receive antennas and a second de-ICI filter is used for the second subset of receive antennas.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

Certain embodiments may provide one or more of the following technical advantages. For example, one advantage is to enable CPE and ICI compensation while reducing phase tracking reference signal overhead.

Particular embodiments enable estimation of de-ICI filter using PT-RS symbols that are positioned in any pre-determined subcarriers, not necessarily consecutive subcarriers. Particular embodiments thus allow the set of PT-RS symbol locations to be chosen arbitrarily and to vary from one OFDM symbol to another. Moreover, the embodiments have a relatively low implementation complexity.

BRIEF DESCRIPTION OF THE DRAWINGS

For a more complete understanding of the disclosed embodiments and their features and advantages, reference is now made to the following description, taken in conjunction with the accompanying drawings, in which:

FIG. 1 is a table illustrating the frequency ranges used for fifth generation (5G) new radio (NR);

FIG. 3 is a table illustrating transmission numerologies supported in NR;

FIG. 5 comprises time and frequency diagrams illustrating CSI-RS patterns;

FIG. 11 is a time and frequency diagram illustrating an example of NR reference signals and PT-RS;

FIG. 12 is a time and frequency diagram illustrating an example placement of reference signals when there is no PT-RS in OFDM symbols with any other NR-RS;

FIG. 17 is flowchart illustrating an example method in a wireless device, according to certain embodiments;

FIG. 24 is a flowchart illustrating a method implemented in a communication system, according to certain embodiments; and FIG. 25 is a flowchart illustrating a method implemented in a communication system, according to certain embodiments.

DETAILED DESCRIPTION

Figure 2:
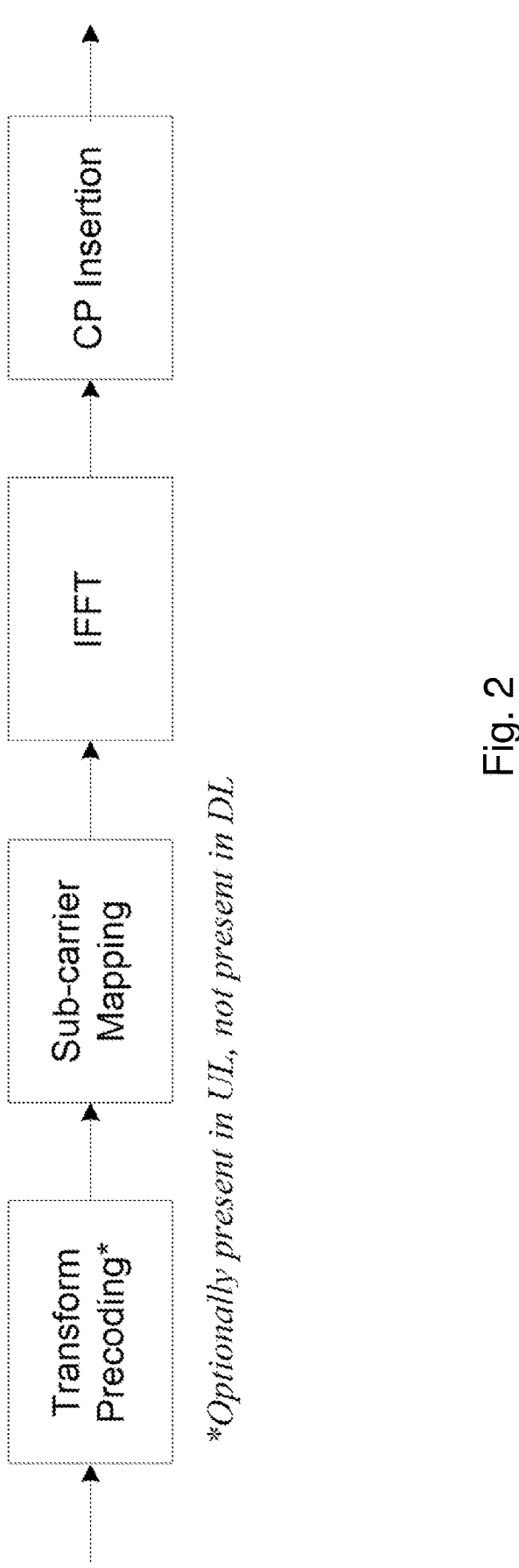
FIG. 2 is a block diagram illustrating the NR transmitter block diagram for CP-OFDM with optional DFT-spreading.
Figure 4:
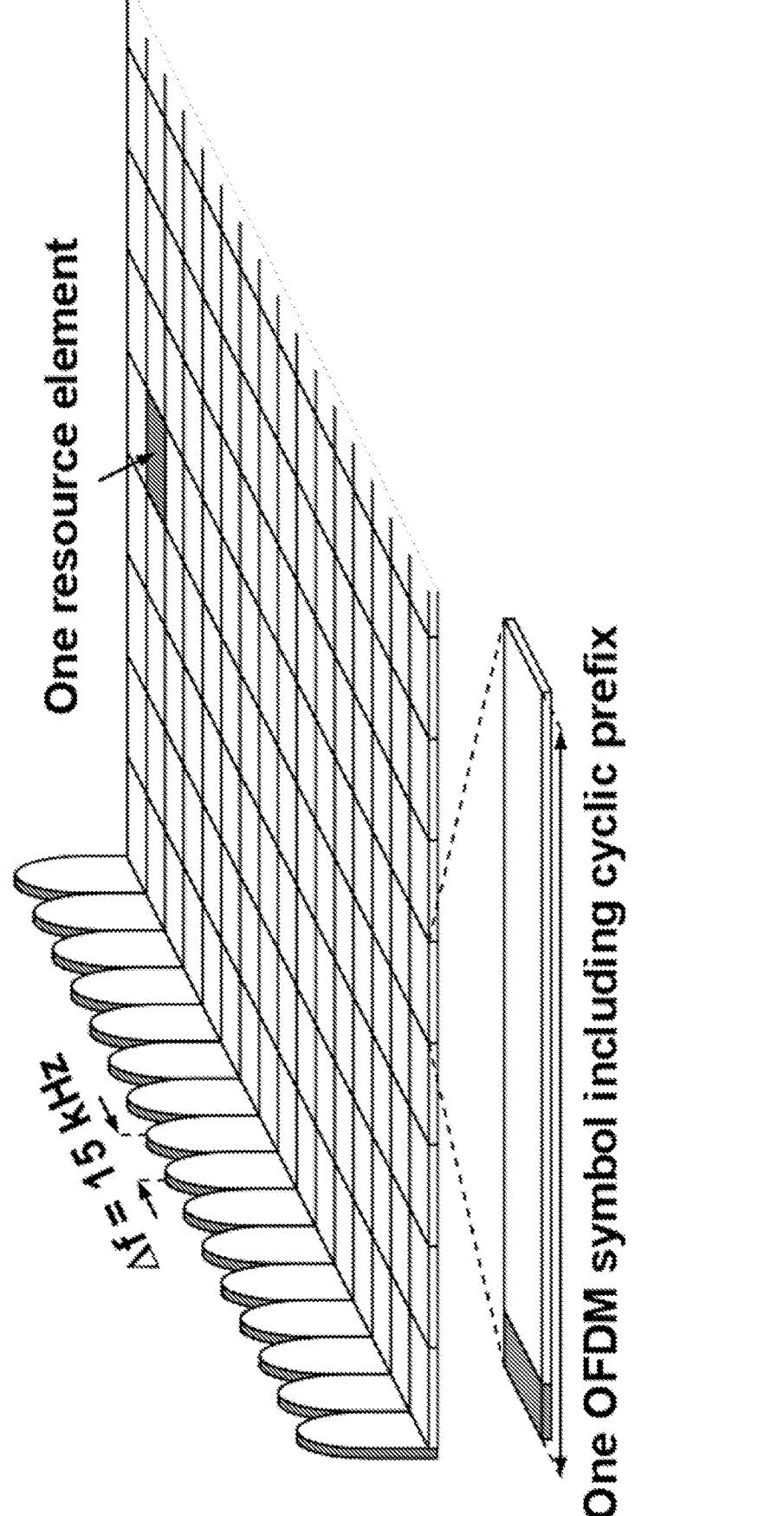
FIG. 4 is a time and frequency diagram illustrating a NR downlink physical resource for 15 kHz sub-carrier spacing numerology.
Figure 6:
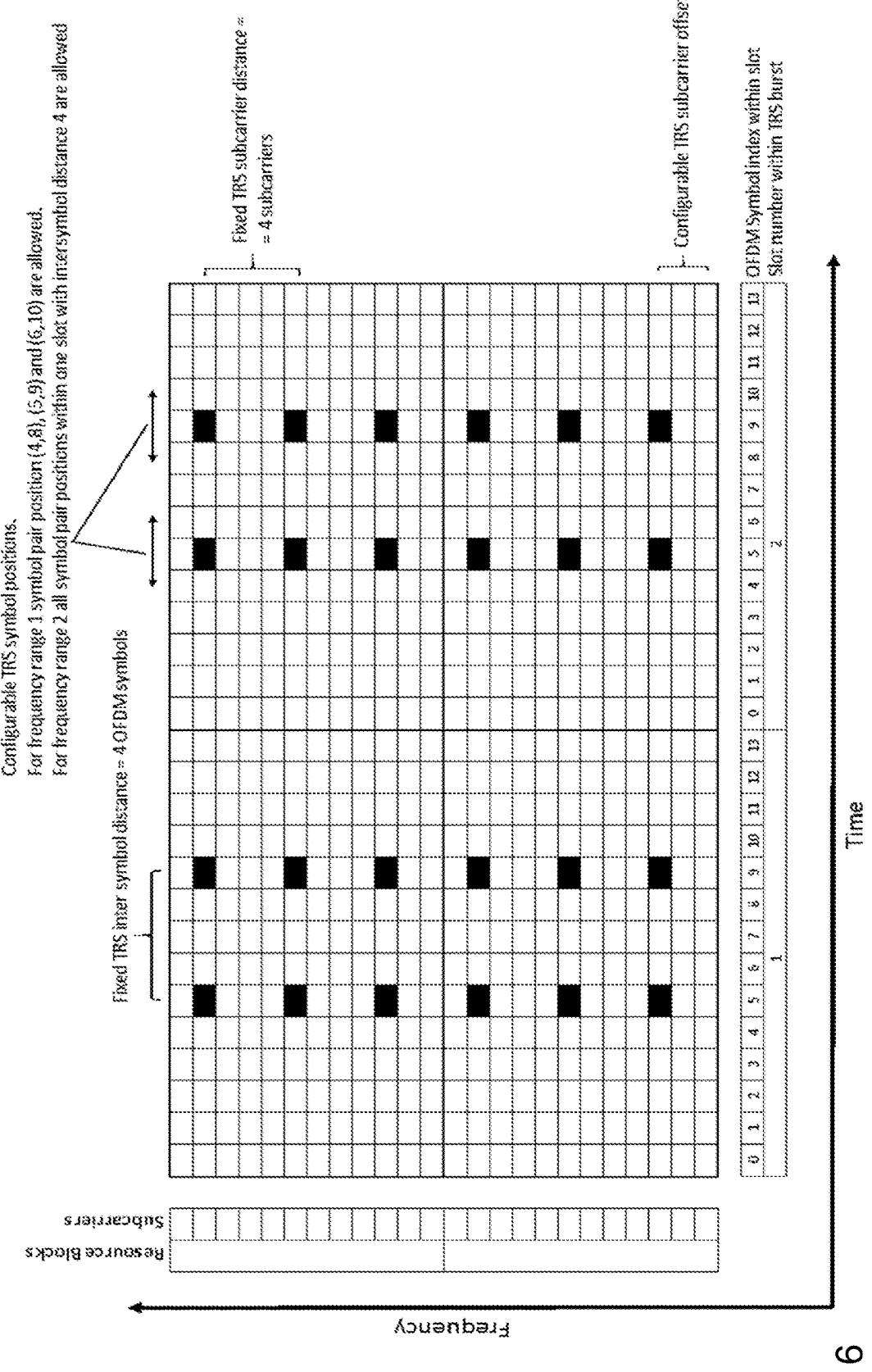
FIG. 6 is a time and frequency diagram illustrating TRS mapping in NR.
Figure 7:
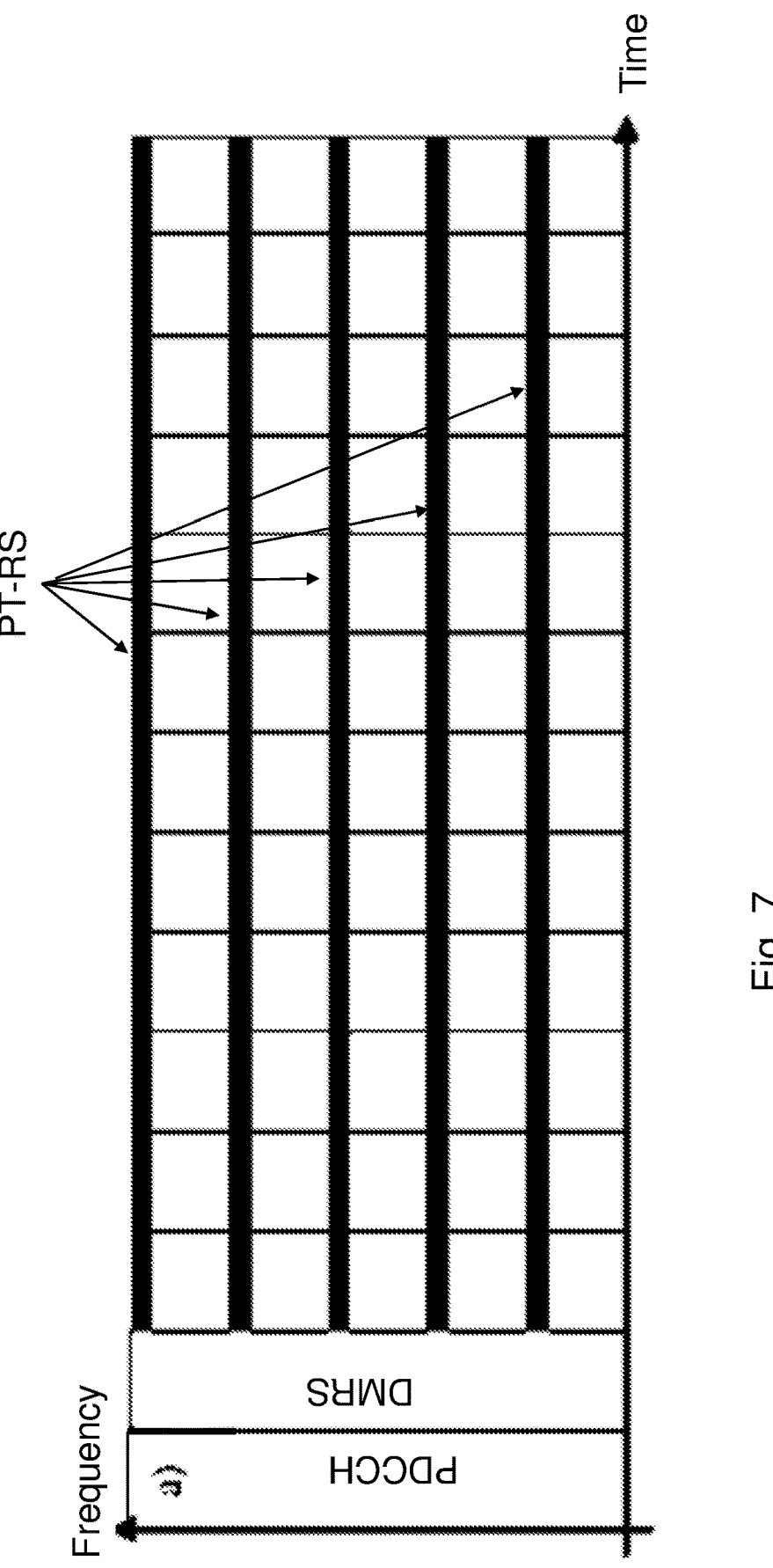
FIG. 7 is a time and frequency diagram illustrating NR PT-RS distributed in frequency domain.
Figure 8:
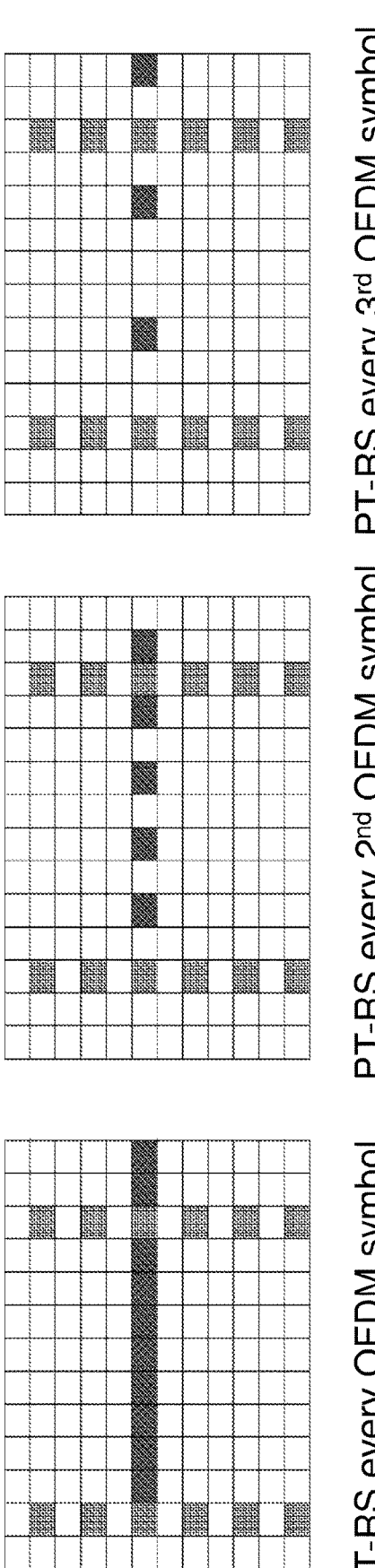
FIG. 8 is a time and frequency diagram illustrating PT-RS with 1+1 DM-RS (2 DM-RS symbols) mapping in NR.
Figure 9:
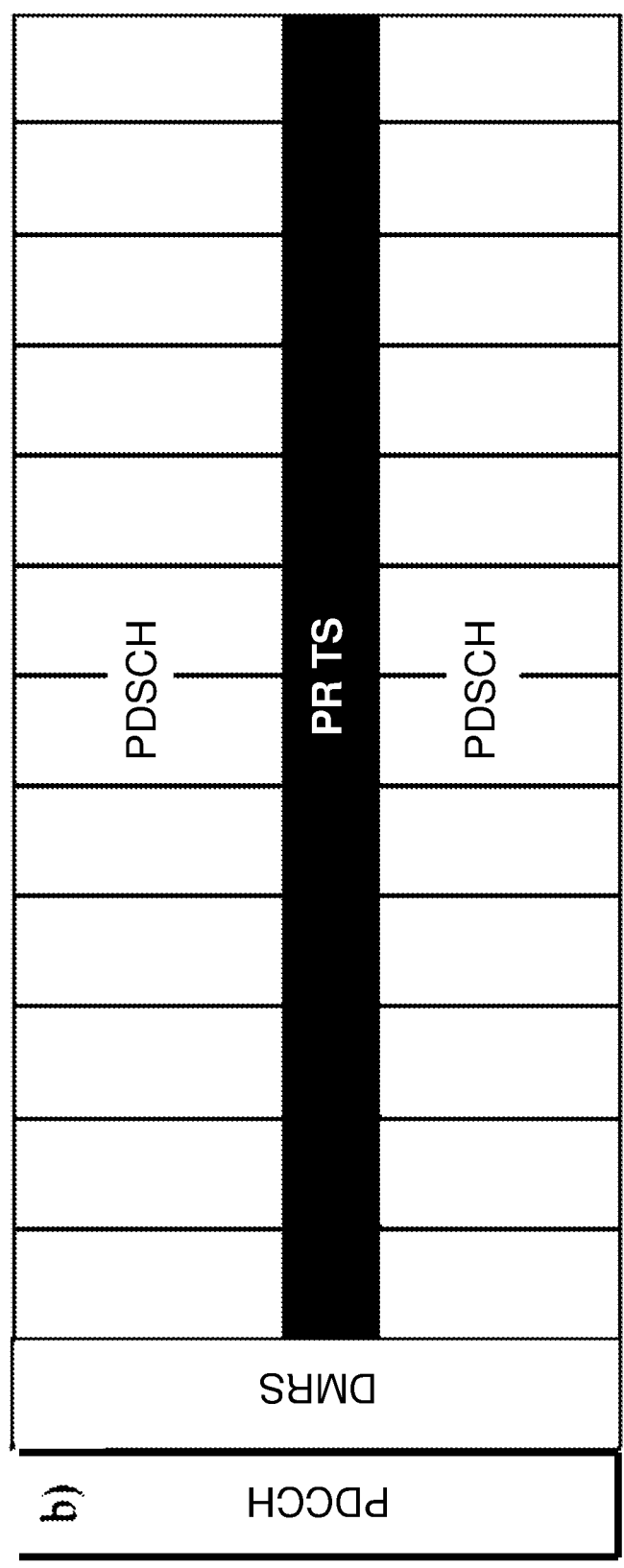
FIG. 9 is a time and frequency diagram illustrating an alternative NR PT-RS structure where PT-RS are clustered in the frequency domain.

As described above, certain challenges currently exist with compensating for inter-carrier interference (ICI) at high frequencies. Certain aspects of the present disclosure and their embodiments may provide solutions to these or other challenges. For example, particular embodiments include a low-complexity method for estimating a de-ICI filter that can be applied directly to the received signal in frequency domain to remove the effect of ICI caused by phase noise or by other impairments, such as those related to frequency misalignment (e.g., frequency offset or Doppler). Particular embodiments enable a direct estimation of the de-ICI filter using phase tracking reference signal (PT-RS) symbols that are positioned in any pre-determined subcarriers, not necessarily consecutive subcarriers. Particular embodiments enable the set of PT-RS symbol locations to be chosen arbitrarily and to vary from one orthogonal frequency division multiplexing (OFDM) symbol to another.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

A first group of embodiments, A1, include direct de-ICI filtering. Let the transmitted symbol and the channel response for sub-carrier k be $S_k$ and $H_k$, respectively. The time-varying phase noise induces ICI in the received signal $R_k$.

$$R_k = \sum_i J_i H_{k-i} S_{k-i} + W_k.$$

Let $K=\{k_0, k_1, \ldots, k_{N-1}\}$ denote the index set of subcarriers where PT-RS are transmitted. The values of $S_k$ at these sub-carriers are thus known and can be used to estimate a de-ICI filter of $2u+1$ taps such that the filter output is relatively free of ICI:

$$\sum_{m=-u}^{u} a_m R_{k-m} \approx H_k S_k \text{ for } k \in \{k_0, k_1, \ldots, k_{N-1}\}.$$

There are M equations in the above regardless of the value of u. This is different than the traditional approach of estimating the ICI filter first, in which a block of M known reference symbols are used to construct only M−2u equations. That is, given the same amount of reference symbols, the direct de-ICI filtering approach has higher reference symbol efficiency than the ICI filter approximation approach.

To proceed with estimating the de-ICI filter, define the matrix and vector notation. First, the $R_u$ matrix collects the received signals at and around the PT-RS:

$$R_u \triangleq \begin{bmatrix} R_{k_0+u} & R_{k_0+u-1} & \cdots & R_{k_0-u} \\ R_{k_1+u} & R_{k_1+u-1} & \cdots & R_{k_1-u} \\ \vdots & \vdots & \ddots & \vdots \\ R_{k_{N-1}+u} & R_{k_{N-1}+u-1} & \cdots & R_{k_{N-1}-u} \end{bmatrix}.$$

The de-ICI filter coefficients are collected into a vector a:

$$a \triangleq \begin{bmatrix} a_{-u} \\ a_{-u+1} \\ \vdots \\ a_u \end{bmatrix}.$$

The known targets, which are products of the channel coefficients and the PT-RS values, are collected into the vector x:

$$x \triangleq \begin{bmatrix} H_{k_0} S_{k_0} \\ \vdots \\ H_{k_{N-1}} S_{k_{N-1}} \end{bmatrix}.$$

For ICI compensation, the (2u+1)-tap de-ICI filter can be obtained from minimizing the residue sum of squares: $\|R_u a_u - x\|^2$. The solution to this least square problem can be expressed as $$\hat{a}_u \triangleq (R_u{}^H R_u)^{-1} R_u{}^H x.$$

Note that $R_u{}^H R_u$ is a (2u+1)×(2u+1) matrix. In practice, good ICI compensation performance can be achieved using u=1, in which case $R_u{}^H R_u$ is a small 3×3 matrix.

To compensate the ICI, the received signal $\{R_k\}$ is filtered by $\{\hat{a}_{-u}, \hat{a}_{-u+1}, \ldots, \hat{a}_u\}$:

$$R'_k \triangleq \sum_{m=-u}^{u} \hat{a}_m R_{k-m}.$$

Note there is no need to apply conjugate or reversal to the estimated de-ICI filter as in the traditional methods. Because the optimization is designed to minimize the ICI after direct filtering, there is no additional theoretical assumption to ensure ICI is well suppressed in the filtered signal. The filtered signal $R'_k$ can then be fed to the OFDM demodulator.

Using the u=1 case as a nonlimiting example embodiment, the procedure can be further illustrated. Each row of the $R_1$ matrix collects the received PT-RS $R_{k_i}$, and its two adjacent received signals $R_{k_i+1}$ and $R_{k_i-1}$:

$$R_1 \triangleq \begin{bmatrix} R_{k_0+1} & R_{k_0} & R_{k_0-1} \\ \vdots & \vdots & \vdots \\ R_{k_{N-1}+1} & R_{k_{N-1}} & R_{k_{N-1}-1} \end{bmatrix}.$$

The center column collects all the received PT-RS, the first column collects all the received signal one sub-carrier index higher than those of the PT-RS, and the last column collects all the received signal one sub-carrier index lower than those of the PT-RS. Therefore, the 3×3 matrix $R_1{}^H R_1$ contains the cross-correlations of these three groups of received signals. That is, the (i, j)-th element of $R_1{}^H R_1$ is given by $$\left(R_1^H R_1\right)_{i,j} \triangleq \sum_{k \in \{k_0, k_1, \ldots, k_{N-1}\}} R^*_{k+2-i} R_{k+2-j}, \text{ for } i, j = 1, 2, 3.$$

The vector $R_1{}^H x$ contains the cross-correlation of the three groups received signals with the known targets, which are the products of the channel coefficients and the PT-RS values. That is, the i-th element of $R_1{}^H x$ is given by $$\left(R_1^H x\right)_i \triangleq \sum_{k \in \{k_0, k_1, \ldots, k_{N-1}\}} R^*_{k+2-i} H_k S_k, \text{ for } i = 1, 2, 3.$$

The de-ICI filter $\hat{a}_1 \triangleq [\hat{a}_{-1}, \hat{a}_0, \hat{a}_1]^t$ is obtained by multiplying the inverse of the cross-correlation matrix of the received signals, denoted by $(R_1{}^H R_1)^{-1}$, to the cross-correlation of the received signals with the known targets $R_1{}^H x$.

To compensate the ICI, the received signal $\{R_k\}$ is filter by $\{\hat{a}_{-1}, \hat{a}_0, \hat{a}_1\}$:

$$R'_k \triangleq \hat{a}_{-1} R_{k+1} + \hat{a}_0 R_k + \hat{a}_1 R_{k-m}.$$

If there are multiple receive antennas connected to the same oscillator, a single de-ICI filter can be estimated and applied to the received signals on the multiple receive antennas. For each receive antenna with antenna index n, let $R_{u,n}$ be the matrix collecting the received signals at and around the PT-RS from receive antenna n. Then the common de-ICI filter for the multiple receive antennas connected to the same oscillator is obtained as:

$$\hat{a}_u \triangleq \left(\sum_n R_{u,n}^H R_{u,n}\right)^{-1} \left(\sum_n R_{u,n}^H\right) x.$$

Figure 10:
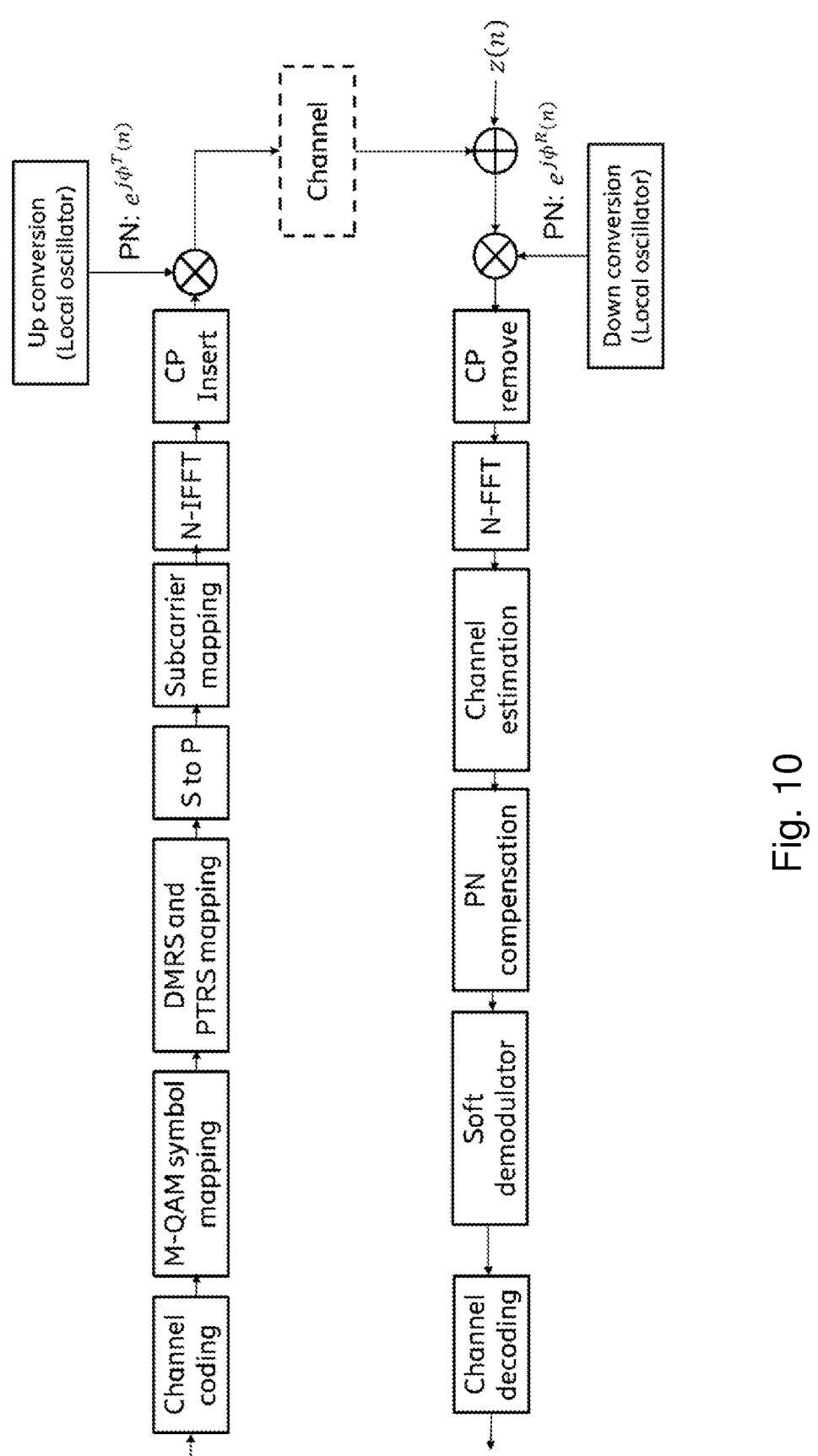
FIG. 10 is a block diagram of Tx-Rx chain.

A simplified block diagram of Tx-Rx chain is illustrated in FIG. 10.

A second group of embodiments, A2, include performance enhancement by combining multiple existing NR reference signals to perform ICI compensation. To perform ICI compensation, it is needed to have a reference signal in each OFDM symbol in which there is data transmission. To ensure this, multiple NR reference signals, e.g., PT-RS, TRS (called "CSI-RS for tracking" in 3GPP specifications), CSI-RS, can be used to enhance accuracy of ICI compensation and thus reduce PT-RS overhead.

Some embodiments use multiple existing NR RSs to enhance ICI compensation accuracy. ICI compensation can be performed on any arbitrary reference signal architecture using the direct de-ICI filtering approach in the first group of example embodiments. This is in contrast to the traditional method that requires a block of contiguous subcarriers, sometimes creating a coexistence problem with other NR reference signals, e.g., TRS.

To enhance ICI compensation accuracy, a UE can utilize PT-RS plus any other existing NR reference signals, e.g., TRS and CSI-RS, as longs as the reference signals experience the same phase noise process as the PT-RS. Different reference signals may experience different channels because different spatial precoding (or the lack thereof) may be applied on different reference signals. However, the same de-ICI filtering approach can be applied jointly over different reference signals by choosing the subcarrier index set $K=\{k_0, k_1, \ldots, k_{N-1}\}$ to include all relevant reference signals and by using the corresponding channel estimates over different reference signals in the de-ICI filter estimation.

Figure 11:
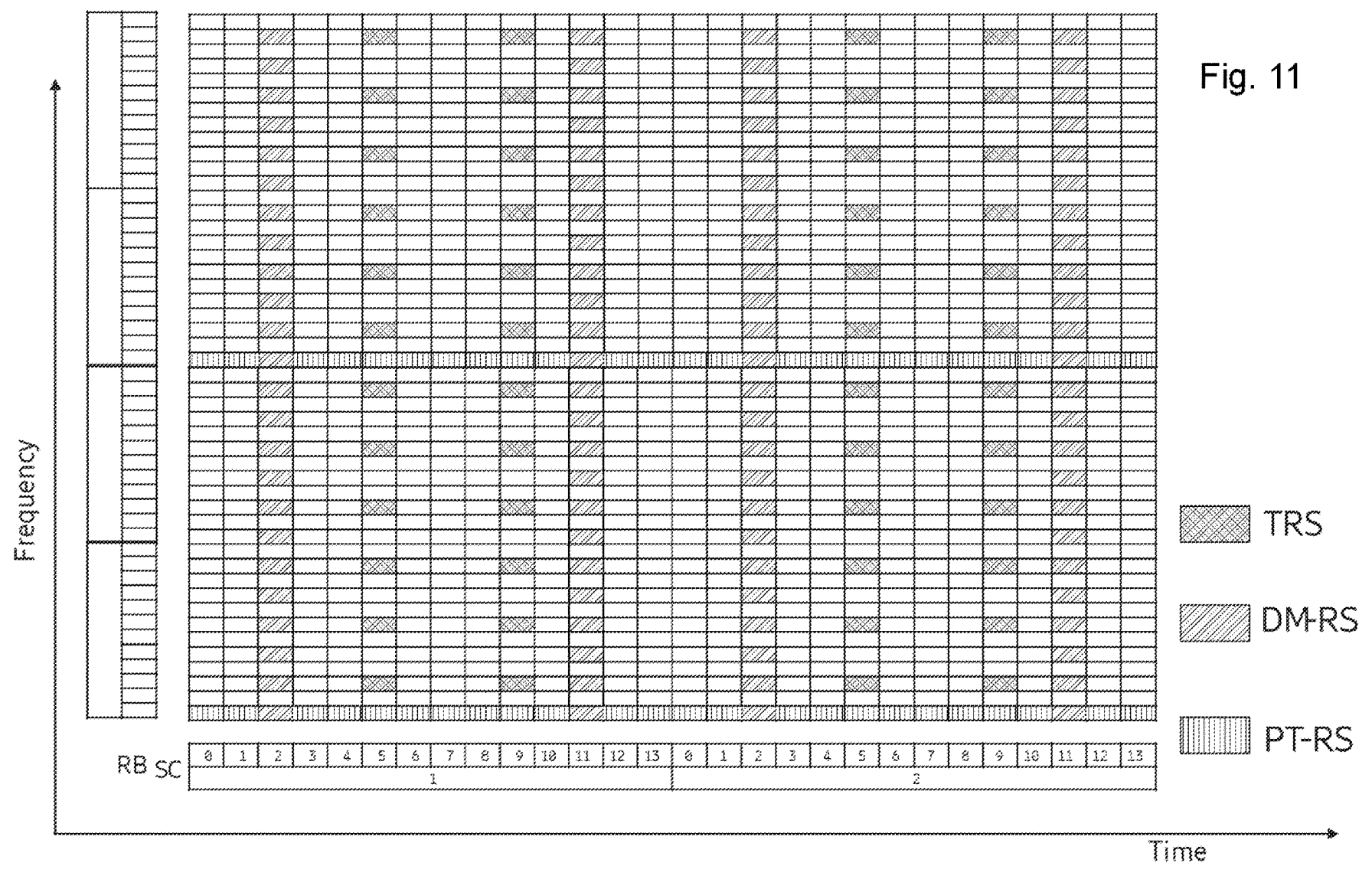

FIG. 11 is a time and frequency diagram illustrating an example of NR reference signals and PT-RS. In the illustrated example, PT-RS and TRS are illustrated in symbols 5 and 9. In this case, the direct de-ICI filtering approach makes joint use of the received samples in TRS sub-carrier locations and PTRS sub-carrier locations in OFDM symbols 5 and 9. This is an example of using multiple existing NR RSs to reduce PT-RS overhead.

Using the direct de-ICI filtering approach in the first group of embodiments, ICI compensation can be performed on any arbitrary reference signal architecture. To reduce PT-RS overhead, there is no need to place PT-RS in each OFDM symbol as long as there is another NR-RS (e.g., TRS or CSI-RS) on that OFDM symbol, and as long as the other NR-RS experiences the same phase noise process as the physical downlink shared channel (PDSCH) in that OFDM symbol.

In OFDM symbols without PT-RS, a UE can use any other existing NR reference signals to perform ICI compensation. If a UE is not capable of using multiple RSs to perform ICI compensation, CPE compensation can be done on OFDM symbols without PT-RS. A non-limiting example of NR reference signal placement when there is no PT-RS in OFDM symbol with TRS (symbols 3 and 9) is illustrated in FIG. 12.

Figure 12:
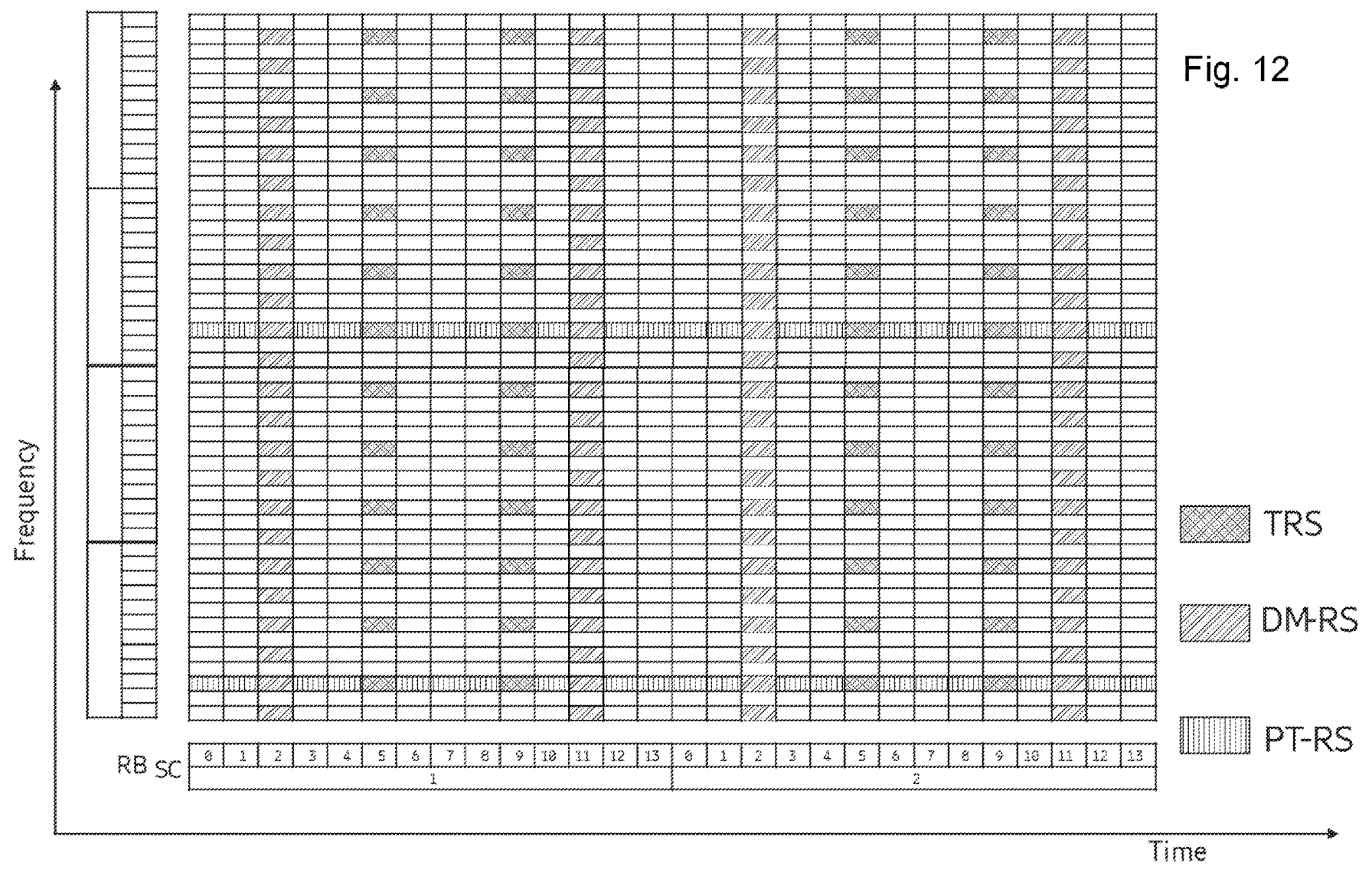

FIG. 12 is a time and frequency diagram illustrating an example placement of reference signals when there is no PT-RS in OFDM symbols with any other NR-RS (e.g., TRS).

A third group of embodiments, A3, include a modified clustered PT-RS structure. In ICI filter approximation approach, to estimate a (2u+1)-tap approximation of the ICI filter, the block size of consecutive known symbols should satisfy M≥4u+1. If PT-RS inserted in all non-DMRS OFDM symbols, there are collision issues between a clustered PT-RS structure and the existing NR reference signals such as CSI-RS and TRS.

Some embodiments include avoiding the clustered PT-RS structure in OFDM symbols with another existing NR-RS. To avoid collision between clustered PT-RS and existing NR-RSs, clustered PT-RS are not placed in OFDM symbols with another reference symbols such as CSI-RS and TRS. A non-limiting example of NR reference signal placement when there is no clustered PT-RS in OFDM symbols with any other NR-RS is illustrated in FIG. 13, as long as the other NR-RS experiences the same phase noise process as the PDSCH in those OFDM symbols.

Figure 13:
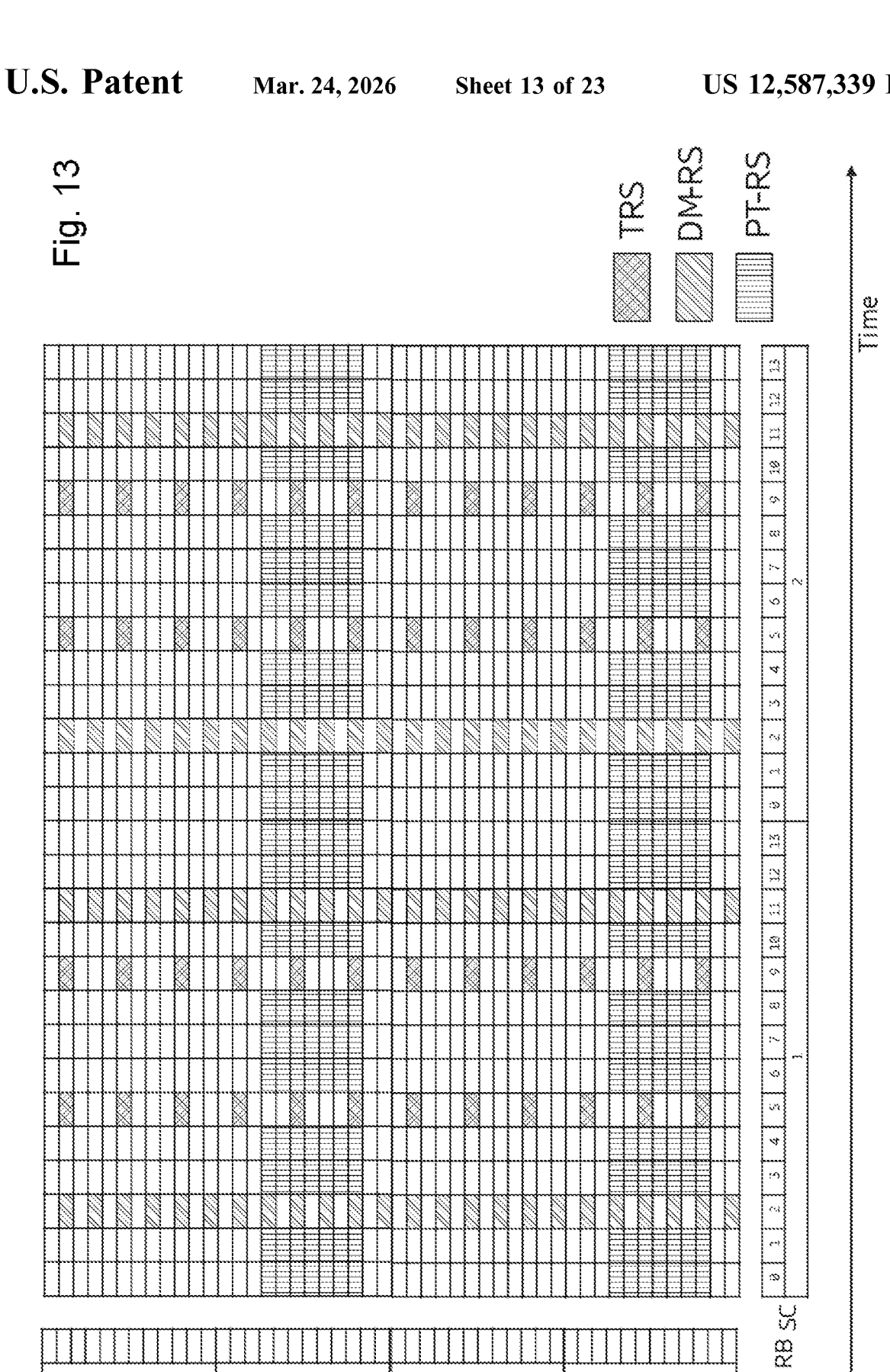
FIG. 13 is a time and frequency diagram illustrating an example placement of placement of clustered PT-RS when there is no PT-RS in OFDM symbols with any other NR-RS.

FIG. 13 is a time and frequency diagram illustrating an example placement of placement of clustered PT-RS when there is no PT-RS in OFDM symbols with any other NR-RS (e.g., TRS). For the clustered PT-RS structure, the UE can perform direct de-ICI filtering approach and use both PT-RS and any other existing NR reference signals, e.g., TRS and CSI-RS to perform ICI compensation.

The UE can perform ICI compensation in OFDM symbols with clustered PT-RS using direct de-ICI filtering or ICI filter approximation approaches. For the ICI filter approximation approach in OFDM symbol(s) without PT-RS, CPE estimation can be done using the other NR-RS. For the direct de-ICI filtering approach, in OFDM symbol(s) without PT-RS the other NR-RS can be used for ICI compensation or CPE compensation. If the other NR-RS experiences substantially different phase noise process in the OFDM symbol(s) without PT-RS as the phase noise process that PT-RS experiences in the other OFDM symbols, interpolation of the ICI filters estimated over the OFDM symbols with PT-RS can also be applied to derive estimate(s) of ICI filter(s) for the OFDM symbol(s) without PT-RS.

Some embodiments include wrapping clustered PT-RS around existing NR-RS. To avoid collision between clustered PT-RS and existing NR-RSs, clustered PT-RS can wrap around existing reference symbols such as CSI-RS and TRS. A non-limiting example of NR reference signal placement when clustered PT-RS wrapped around TRS is illustrated in FIG. 14.

Figure 14:
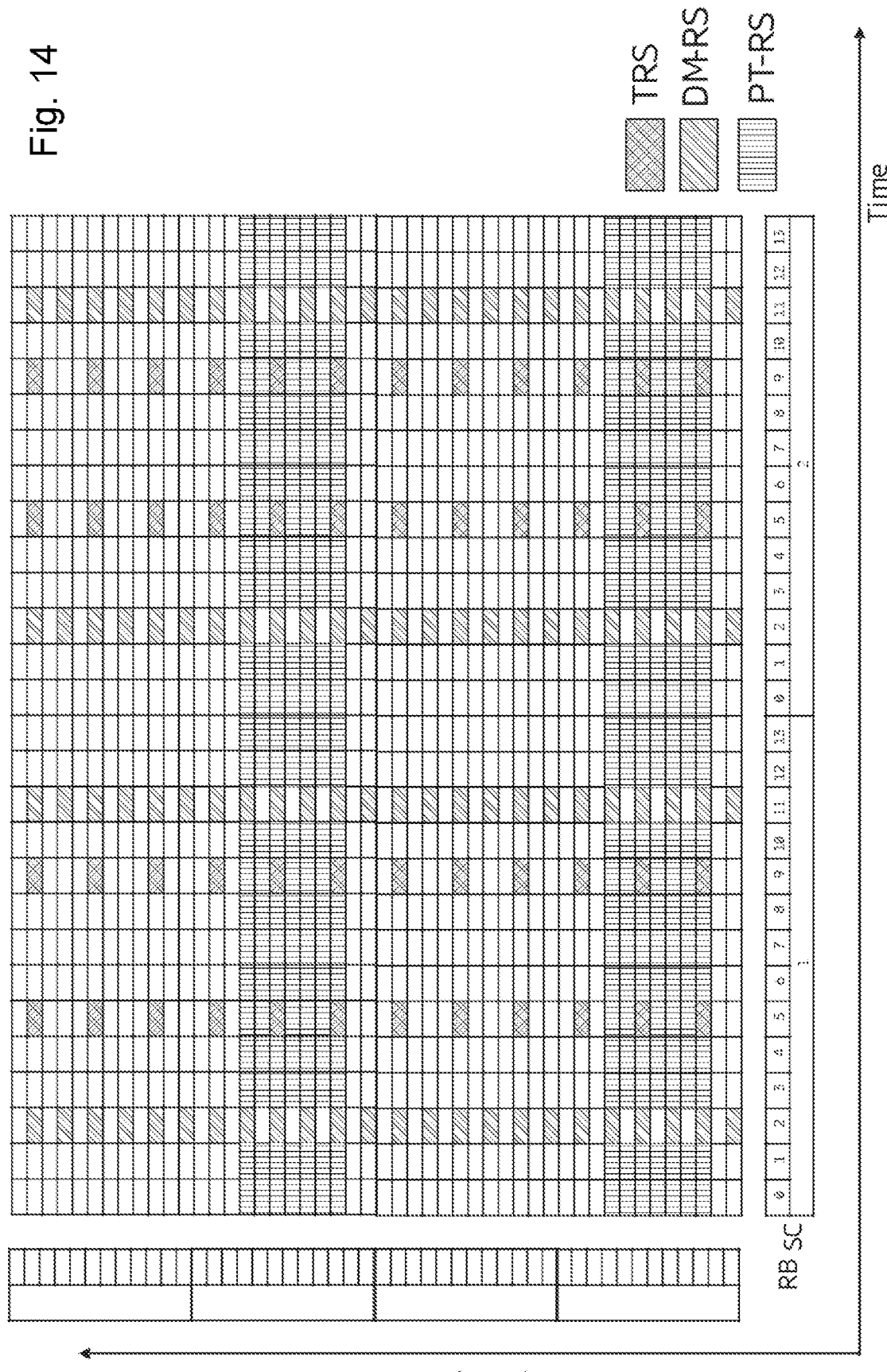
FIG. 14 is a time and frequency diagram illustrating an example placement of clustered PT-RS wrapping around existing NR-RS.

FIG. 14 is a time and frequency diagram illustrating an example placement of clustered PT-RS wrapping around existing NR-RS (e.g., TRS). For this clustered PT-RS structure, the UE can perform ICI compensation by utilizing both PT-RS and any other existing NR reference signals, e.g., TRS and CSI-RS, using either direct de-ICI filtering or ICI filter approximation approaches as long as the other NR-RS experiences the same phase noise process as the PDSCH in those OFDM symbols with other NR-RS. The UE can perform ICI compensation by utilizing only PT-RS, but not any other existing NR reference signals, using the direct de-ICI filtering approach. For UEs which are not capable of using multiple RSs to perform ICI compensation, CPE compensation can be done in OFDM symbols in which PT-RS wrapped around existing NR-RSs. In OFDM symbols with clustered PT-RS, ICI compensation can be performed using direct de-ICI filtering or ICI filter approximation approaches.

Figure 15:
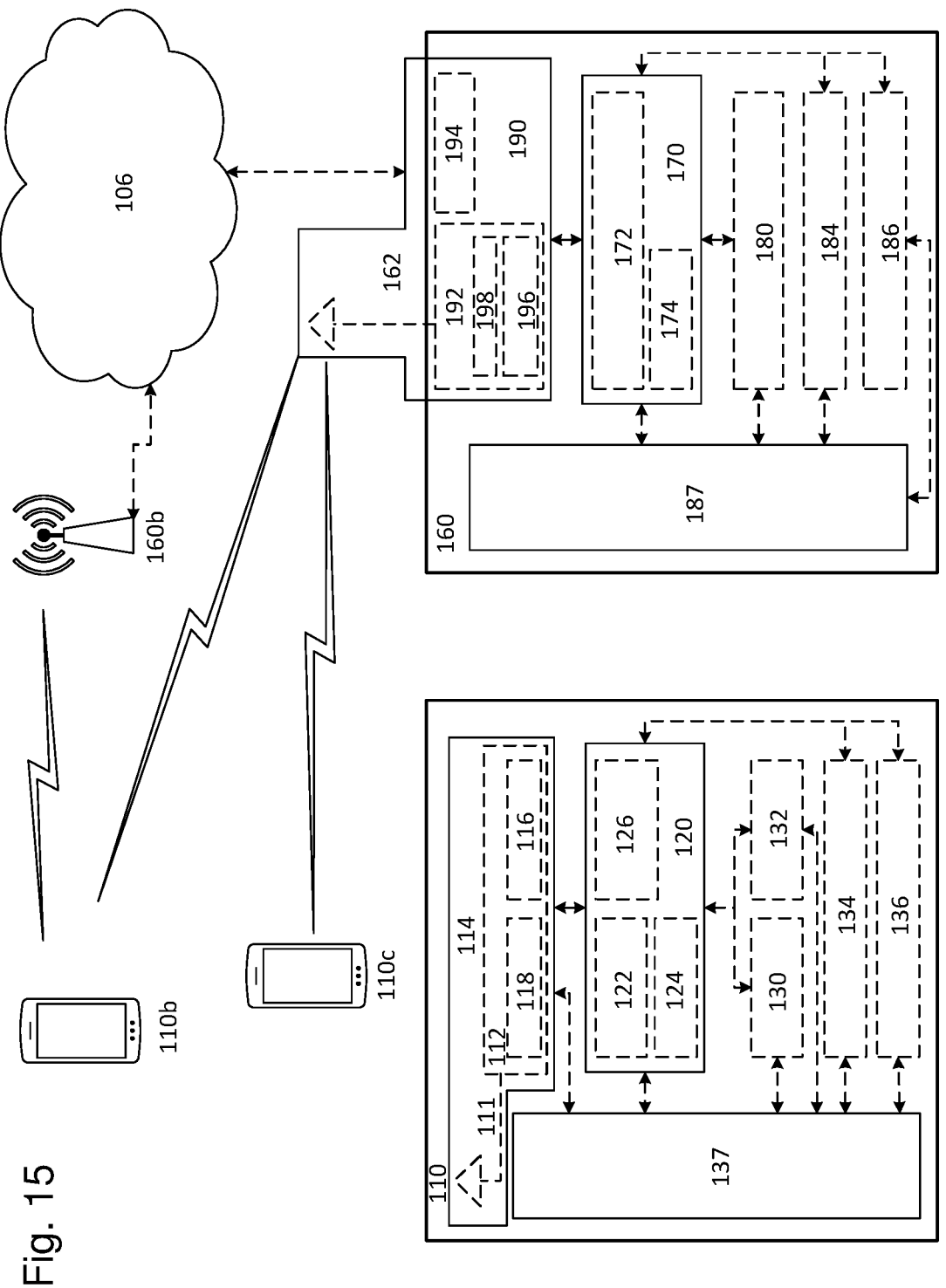
FIG. 15 is a block diagram illustrating an example wireless network.

FIG. 15 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 160 includes processing circuitry 170, device readable medium 180, interface 190, auxiliary equipment 184, power source 186, power circuitry 187, and antenna 162. Although network node 160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node

160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 15 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD

110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device.

Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 16:
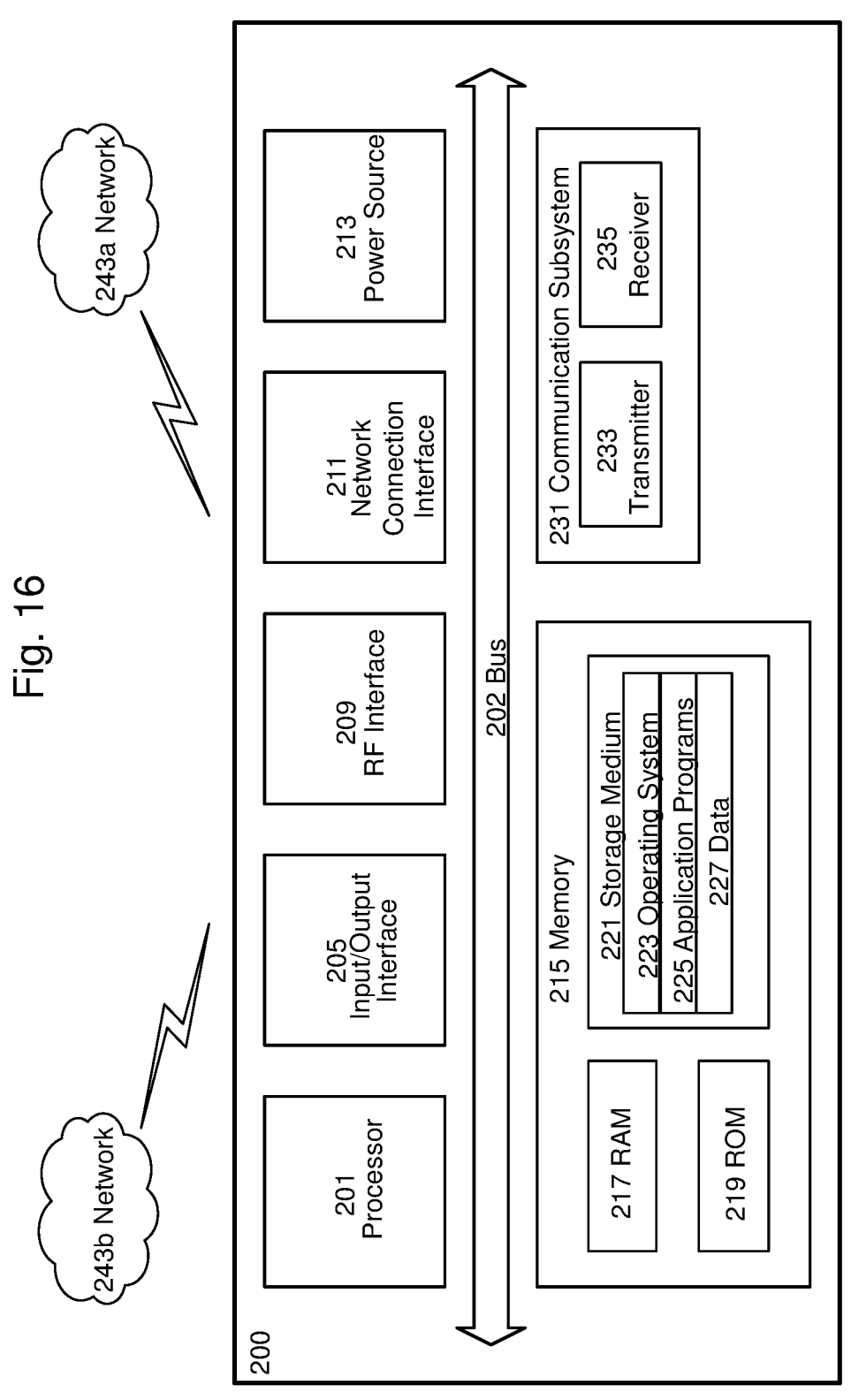
FIG. 16 illustrates an example user equipment, according to certain embodiments.

FIG. 16 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 16, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

FIG. 17 is a flowchart illustrating an example method in a wireless device, according to certain embodiments. In particular embodiments, one or more steps of FIG. 17 may be performed by wireless device 110 described with respect to FIG. 15.

The method may begin at step 1712, where the wireless device (e.g., wireless device 110) receives a wireless signal $R_k$ over all subcarriers allocated to the wireless device. The signal $R_k$ comprises a PT-RS on a subset of subcarriers allocated to the wireless device. The signal may comprise any of the PT-RS configurations described herein.

At step 1714, the wireless device computes a de-ICI filter based on a cross correlation of the received PT-RS and one or more additional subcarriers.

In particular embodiments, the one or more additional subcarriers are adjacent to the PT-RS.

In particular embodiments, the PT-RS and the one or more additional subcarriers are not all contiguous subcarriers (i.e., the subset of PT-RS subcarriers may not all be contiguous and/or the one or more additional subcarriers may not all be contiguous with each other or with the PT-RS.

In particular embodiments, the one or more additional subcarriers comprise a reference signal other than a PT-RS, such as a new radio (NR) reference signal (e.g., TRS, CSI-RS, etc.).

In particular embodiments, the PT-RS comprises a subset of symbols of its subcarrier. The remaining symbols of the subcarrier not in the PT-RS subset may comprise a reference signal (e.g., TRS, CSI-RS, etc.).

In particular embodiments, the wireless device comprises more than one receive antennas. All of the more than one receive antennas may be associated with a local oscillator and a same de-ICI filter may be used for each receive antenna. A first subset of the more than one receive antennas may be associated with a first local oscillator, a second subset of the more than one receive antennas may be associated with a second local oscillator, and a first de-ICI filter may be used for the first subset of receive antennas and a second de-ICI filter may be used for the second subset of receive antennas.

The wireless device may compute the de-ICI filter according to any of the embodiments, examples, and equations described herein, such as with respect to FIGS. 9-14.

At step 1716, the wireless device applies the de-ICI filter to the received signal $R_k$ to generate a de-ICI filtered signal.

Modifications, additions, or omissions may be made to method 1700 of FIG. 17. Additionally, one or more steps in the method of FIG. 17 may be performed in parallel or in any suitable order.

Figure 18:
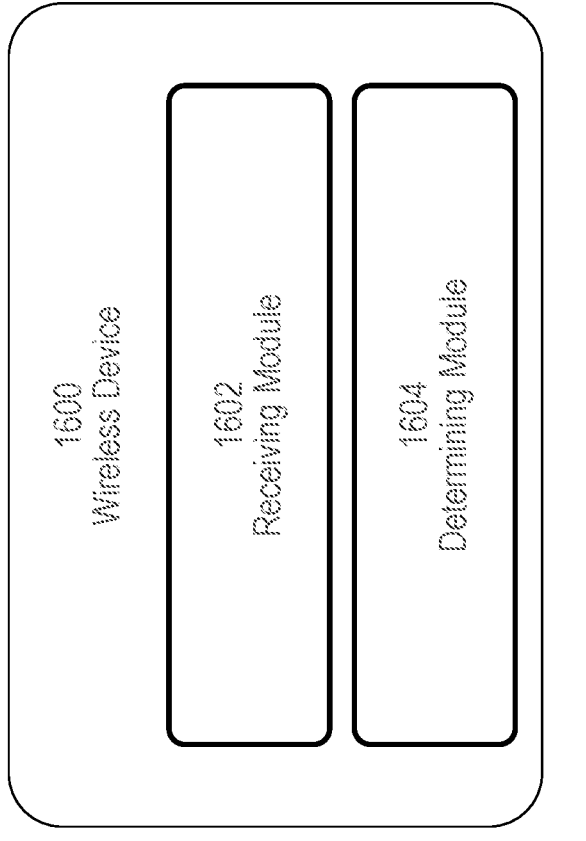
FIG. 18 illustrates a schematic block diagram of a wireless device in a wireless network, according to certain embodiments.

FIG. 18 illustrates a schematic block diagram of an apparatus in a wireless network (for example, the wireless network illustrated in FIG. 15). The apparatus includes a wireless device (e.g., wireless device 110 illustrated in FIG. 15). Apparatus 1600 is operable to carry out the example method described with reference to FIG. 17, and possibly any other processes or methods disclosed herein. It is also to be understood that the method of FIG. 17 is not necessarily carried out solely by apparatus 1600. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, and any other suitable units of apparatus 1600 to perform corresponding functions according one or more embodiments of the present disclosure.

As illustrated in FIG. 18, apparatus 1600 includes receiving module 1602 configured to receive a wireless signal, according to any of the embodiments and examples described herein. Apparatus 1600 also includes determining module 1604 configured to estimate and apply a de-ICI filter, according to any of the embodiments and examples described herein.

Figure 19:
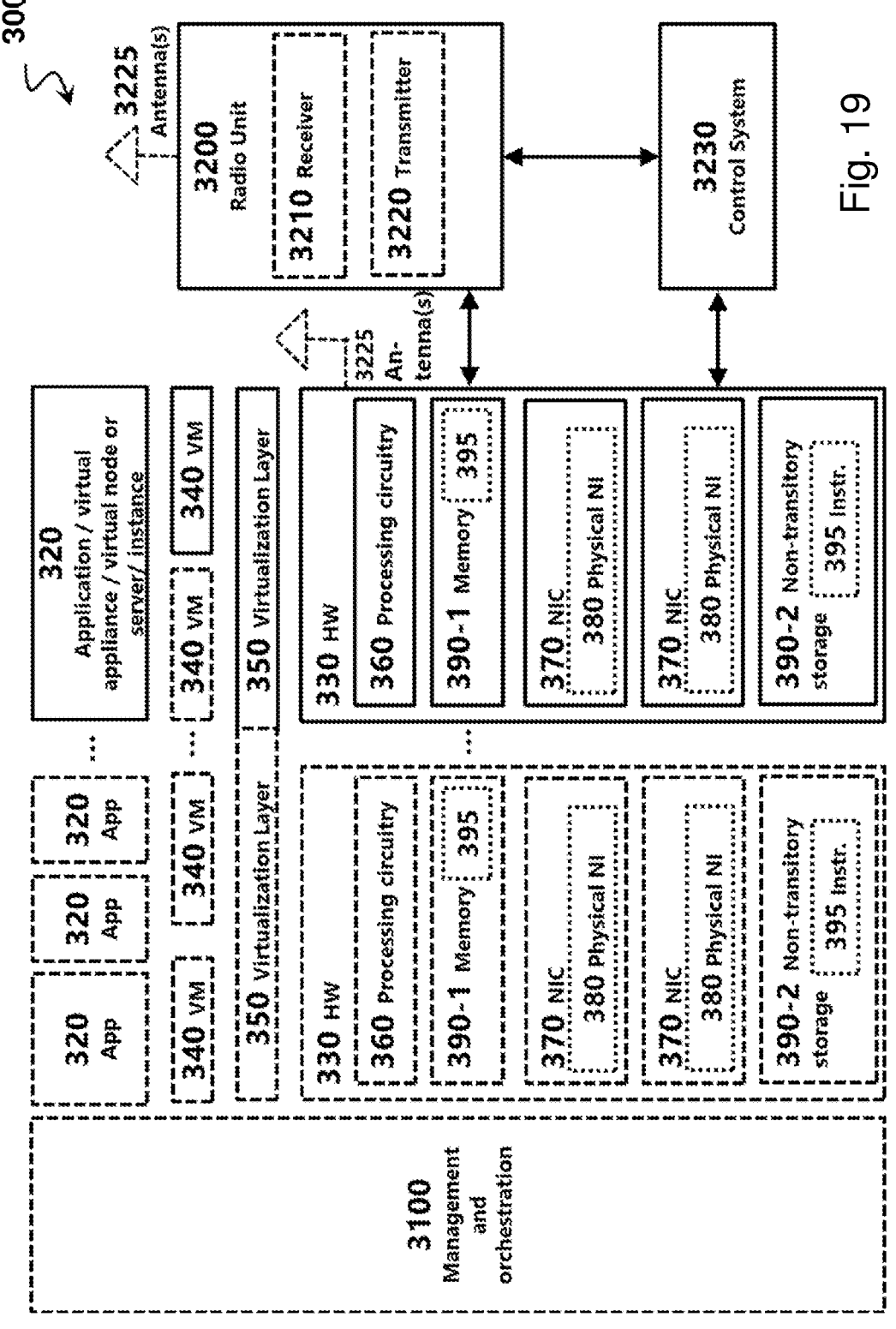
FIG. 19 illustrates an example virtualization environment, according to certain embodiments.

FIG. 19 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 19, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 20:
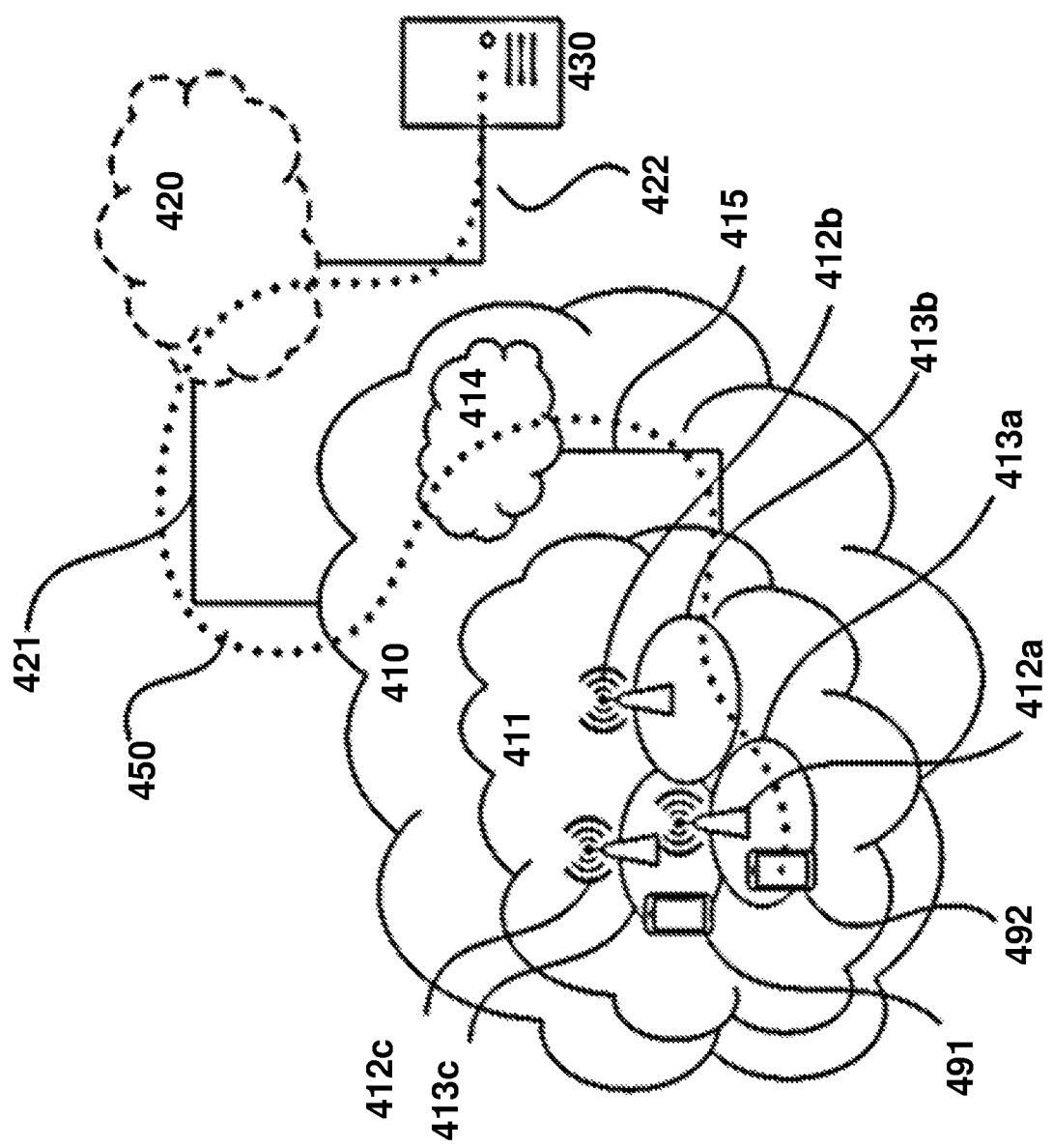
FIG. 20 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 20.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 20, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 20 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 21:
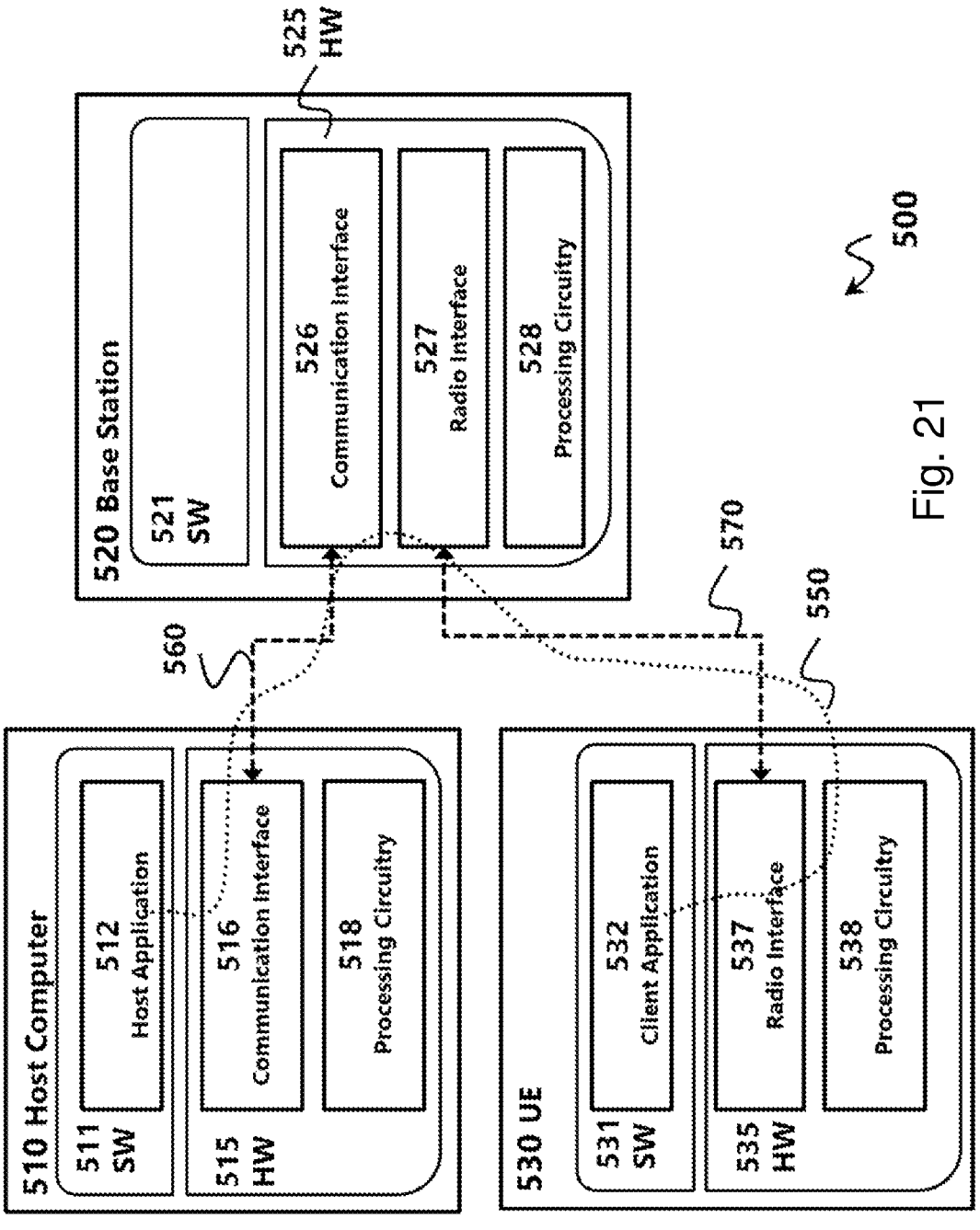
FIG. 21 illustrates an example host computer communicating via a base station with a user equipment over a partially wireless connection, according to certain embodiments.

FIG. 21 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 21. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 21) served by base station 520. Communication interface 526 may be configured to facilitate connection 560 to host computer 510. Connection 560 may be direct, or it may pass through a core network (not shown in FIG. 21) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 21 may be similar or identical to host computer 430, one of base stations 412*a*, 412*b*, 412*c* and one of UEs 491, 492 of FIG. 20, respectively. This is to say, the inner workings of these entities may be as shown in FIG. 21 and independently, the surrounding network topology may be that of FIG. 20.

In FIG. 21, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 22:
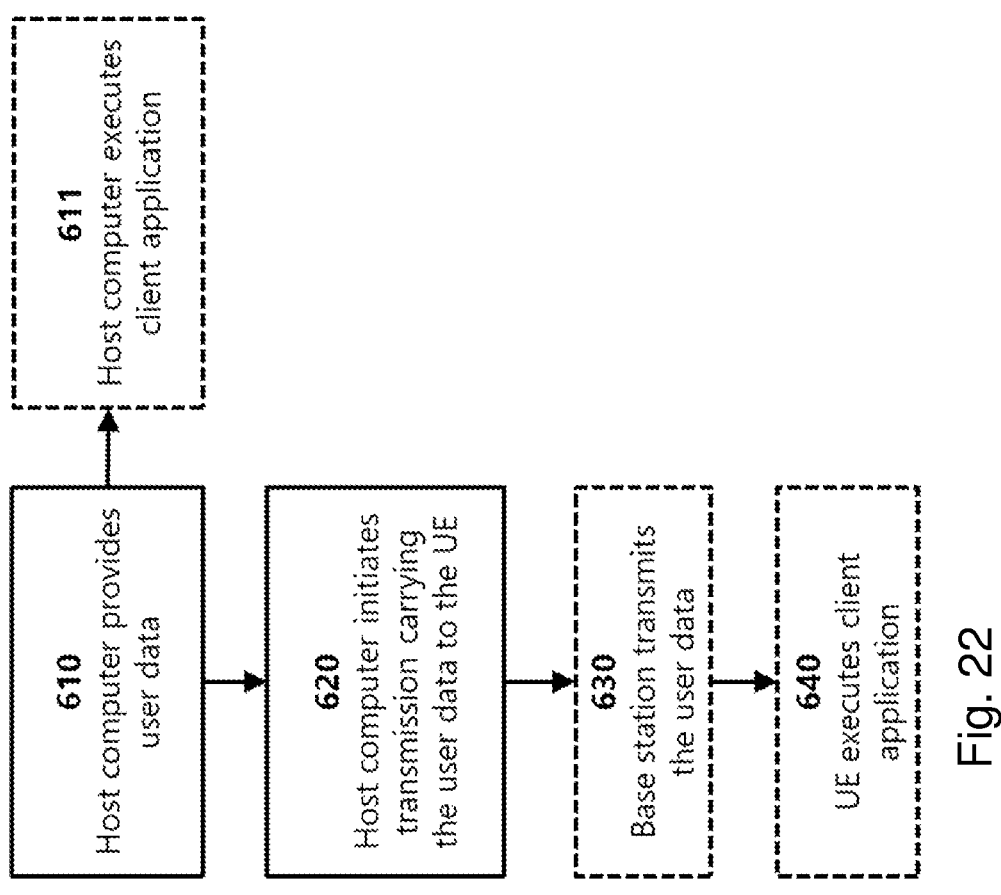
FIG. 22 is a flowchart illustrating a method implemented, according to certain embodiments.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 23:
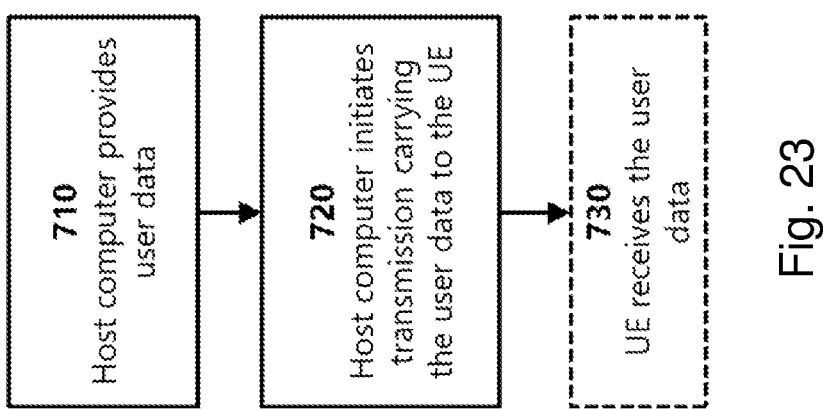
FIG. 23 is a flowchart illustrating a method implemented in a communication system, according to certain embodiments.

FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a wireless device, the method comprising:
   receiving a signal $R_k$ over all subcarriers allocated to the wireless device, the signal $R_k$ comprising a phase tracking reference signal (PT-RS) on a subset of subcarriers allocated to the wireless device;
   computing a de-inter-carrier interference (de-ICI) filter based on a cross correlation of the received PT-RS and one or more additional subcarriers around the subset of subcarriers, a cross-correlation of the received PT-RS and estimated target PT-RS, and a cross-correlation of the one or more additional subcarriers with the estimated PT-RS; and
   applying the de-ICI filter to the received signal $R_k$ to generate a de-ICI filtered signal.

2. The method of claim 1, wherein the one or more additional subcarriers are adjacent to the PT-RS.

3. The method of claim 1, wherein the PT-RS and the one or more additional subcarriers are not all contiguous subcarriers.

4. The method of claim 1, wherein the one or more additional subcarriers comprise a reference signal other than a PT-RS.

5. The method of claim 4, wherein the reference signal comprises a new radio (NR) reference signal.

6. The method of claim 4, wherein the reference signal comprises one of a tracking reference signal (TRS) and a channel state information reference signal (CSI-RS).

7. The method of claim 1, wherein the PT-RS comprises a subset of symbols on the subset of subcarriers.

8. The method of claim 7, wherein the remaining subcarriers not in the subset of subcarriers comprise a reference signal.

9. The method of claim 8, wherein a first subset of the more than one receive antennas are associated with a first local oscillator, a second subset of the more than one receive antennas are associated with a second local oscillator, and a first de-ICI filter is used for the first subset of receive antennas and a second de-ICI filter is used for the second subset of receive antennas.

10. The method of claim 1, wherein the wireless device comprises more than one receive antennas.

11. A wireless device comprising:
    a wireless communication interface; and
    processing circuitry in communication with the wireless communication interface so as to be operable to:
    receive a signal $R_k$ over all subcarriers allocated to the wireless device, the signal $R_k$ comprising a phase tracking reference signal (PT-RS) on a subset of subcarriers allocated to the wireless device;
    compute a de-inter-carrier interference (ICI) filter based on a cross correlation of the received PT-RS and one or more additional subcarriers around the subset of subcarriers, a cross-correlation of the received PT-RS and estimated target PT-RS, and a cross-correlation of the one or more additional subcarriers with the estimated PT-RS; and
    apply the de-ICI filter to the received signal $R_k$ to generate a de-ICI filtered signal.

12. The wireless device of claim 11, wherein the one or more additional subcarriers are adjacent to the PT-RS.

13. The wireless device of claim 11, wherein the PT-RS and the one or more additional subcarriers are not all contiguous subcarriers.

14. The wireless device of claim 11, wherein the one or more additional subcarriers comprise a reference signal other than a PT-RS.

15. The wireless device of claim 14, wherein the reference signal comprises a new radio (NR) reference signal.

16. The wireless device of claim 14, wherein the reference signal comprises one of a tracking reference signal (TRS) and a channel state information reference signal (CSI-RS).

17. The wireless device of claim 11, wherein the PT-RS comprises a subset of symbols on the subset of subcarriers.

18. The wireless device of claim 17, wherein the remaining subcarriers not in the subset comprise a reference signal.

19. The wireless device of claim 18, wherein a first subset of the more than one receive antennas are associated with a first local oscillator, a second subset of the more than one receive antennas are associated with a second local oscillator, and a first de-ICI filter is used for the first subset of receive antennas and a second de-ICI filter is used for the second subset of receive antennas.

20. The wireless device of claim 11, wherein the wireless communication interface comprises more than one receive antennas.

\* \* \* \* \*